US008011617B2

(12) United States Patent
Curry et al.

(10) Patent No.: US 8,011,617 B2
(45) Date of Patent: Sep. 6, 2011

(54) COMPACT CARGO LIFT FOR COMMERICAL AIRCRAFT

(76) Inventors: James M. Curry, Lake Stevens, WA (US); Randolph Schemkes, Snohomish, WA (US)

(*) Notice: Subject to any disclaimer, the term of this patent is extended or adjusted under 35 U.S.C. 154(b) by 690 days.

(21) Appl. No.: 11/297,020

(22) Filed: Dec. 7, 2005

(65) Prior Publication Data

US 2011/0068225 A1    Mar. 24, 2011

Related U.S. Application Data

(60) Provisional application No. 60/691,633, filed on Jun. 17, 2005.

(51) Int. Cl.
*B64C 1/20* (2006.01)
*B64D 9/00* (2006.01)

(52) U.S. Cl. .................. 244/118.1; 244/137.1

(58) Field of Classification Search ............... 244/118.1, 244/118.5, 137.1, 137.2; 198/463.1, 468.1, 198/468.8, 511; 414/331.14, 347
See application file for complete search history.

(56) References Cited

U.S. PATENT DOCUMENTS

| 3,019,757 A | * | 2/1962 | Bailey ........................... 114/72 |
| 3,028,130 A | * | 4/1962 | Burton ......................... 244/137.1 |
| 4,287,967 A | * | 9/1981 | Perkins ........................... 187/268 |
| 4,653,707 A | * | 3/1987 | Hamilton et al. ............. 244/137.2 |
| 5,314,143 A | | 5/1994 | Luria |
| 5,413,292 A | | 5/1995 | Luria |
| 6,808,142 B2 | * | 10/2004 | Oki ............................. 244/118.1 |

FOREIGN PATENT DOCUMENTS

WO    WO 95/23733    9/1995

* cited by examiner

*Primary Examiner* — Tien Dinh
(74) *Attorney, Agent, or Firm* — Todd N. Hathaway

(57) ABSTRACT

An apparatus for transferring cargo between an upper, passenger deck and a lower, cargo deck of an aircraft. A lift platform raises palletized cargo from the lower deck through an opening formed in the upper deck. The drive mechanism is housed entirely within the lift platform itself. The platform is stabilized by flanking, scissors-action leg assemblies, that nest alongside the platform when stowed. The platform is stowed in the raised position, within the opening formed in the upper deck. Locking assemblies attach the lift platform to the sides of the opening so that the platform becomes a load-bearing structural component of the upper deck when stowed. A recess is formed in the lower deck for receiving the lift platform when lowered. A translating floor assembly having folding floor sections lowers to clear the recess, and then raises to define a floor surface over the opening when the lift platform is not in use.

15 Claims, 28 Drawing Sheets

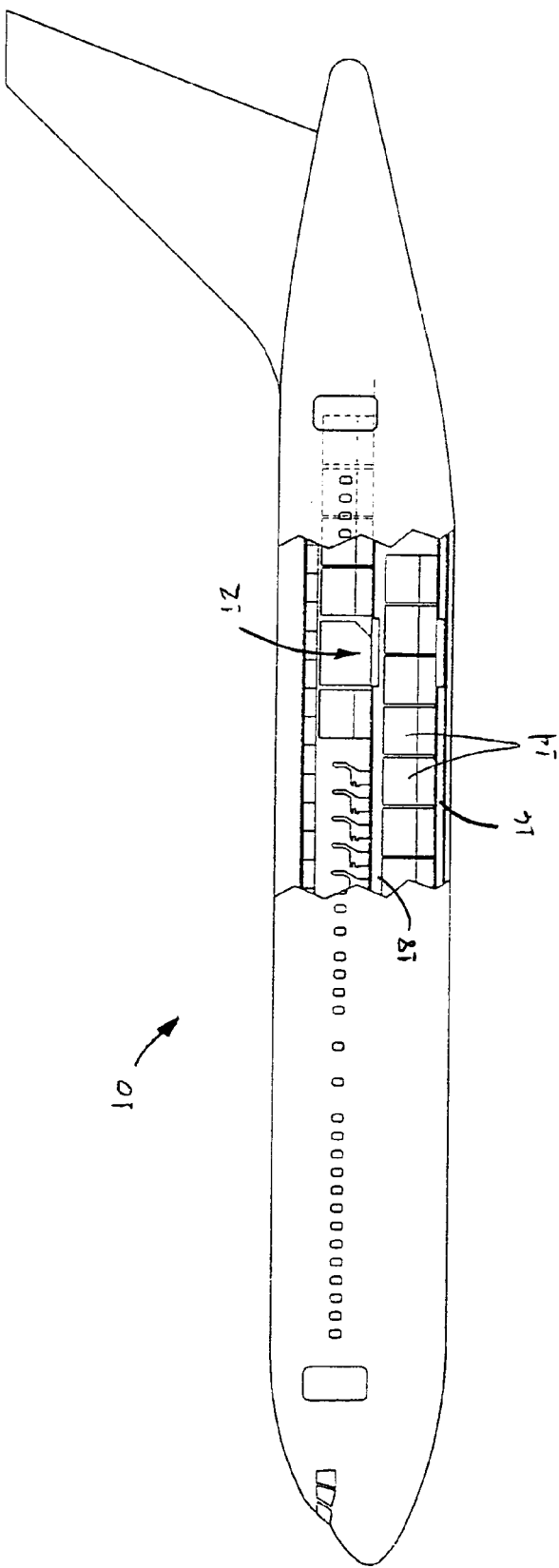

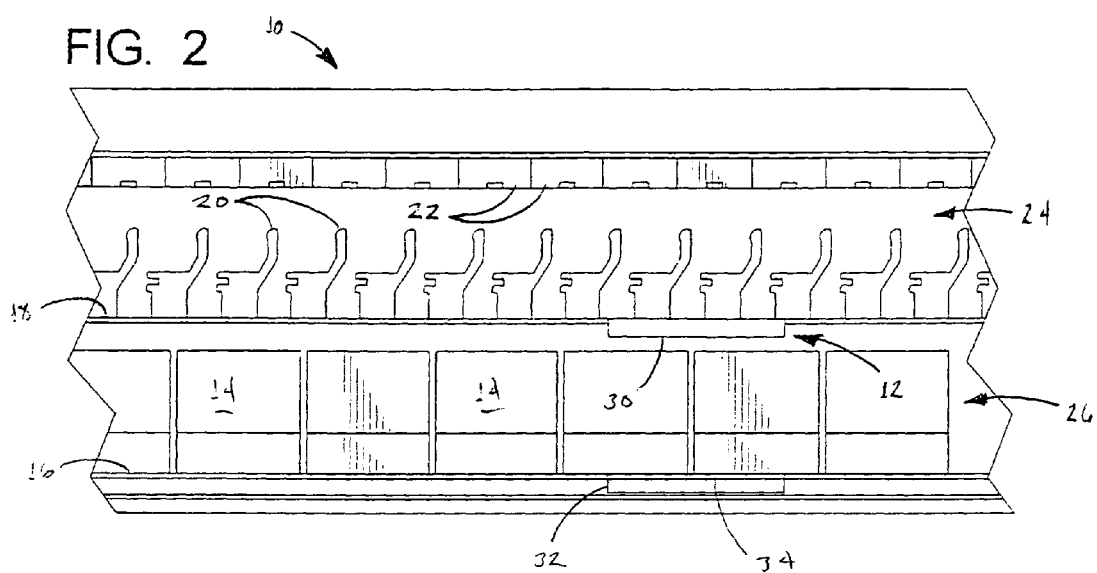
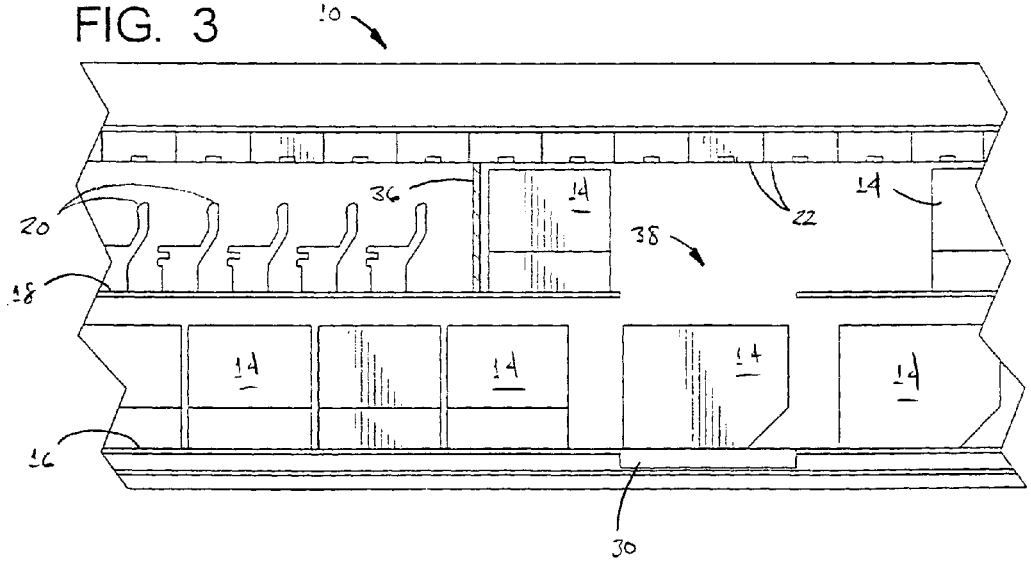

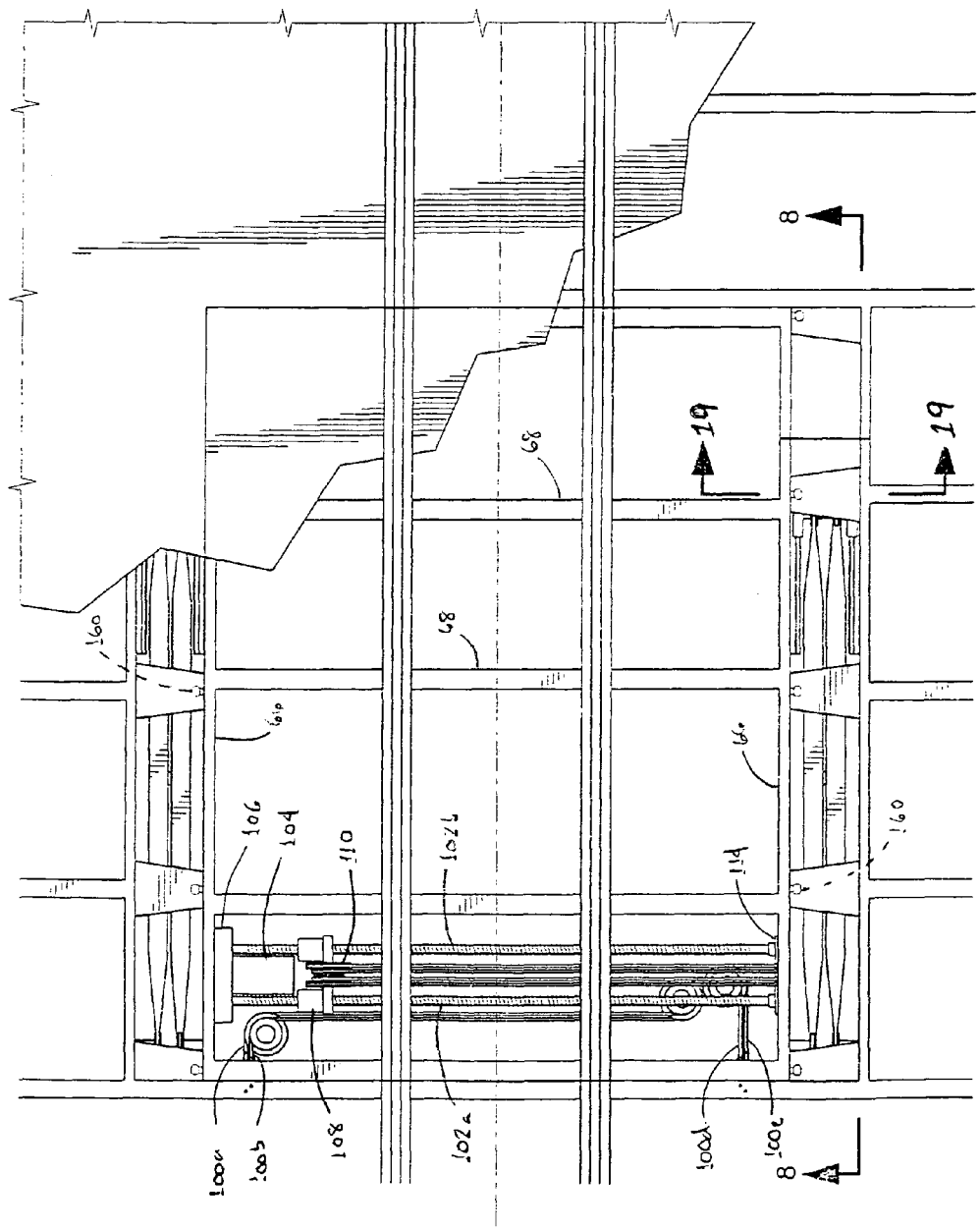

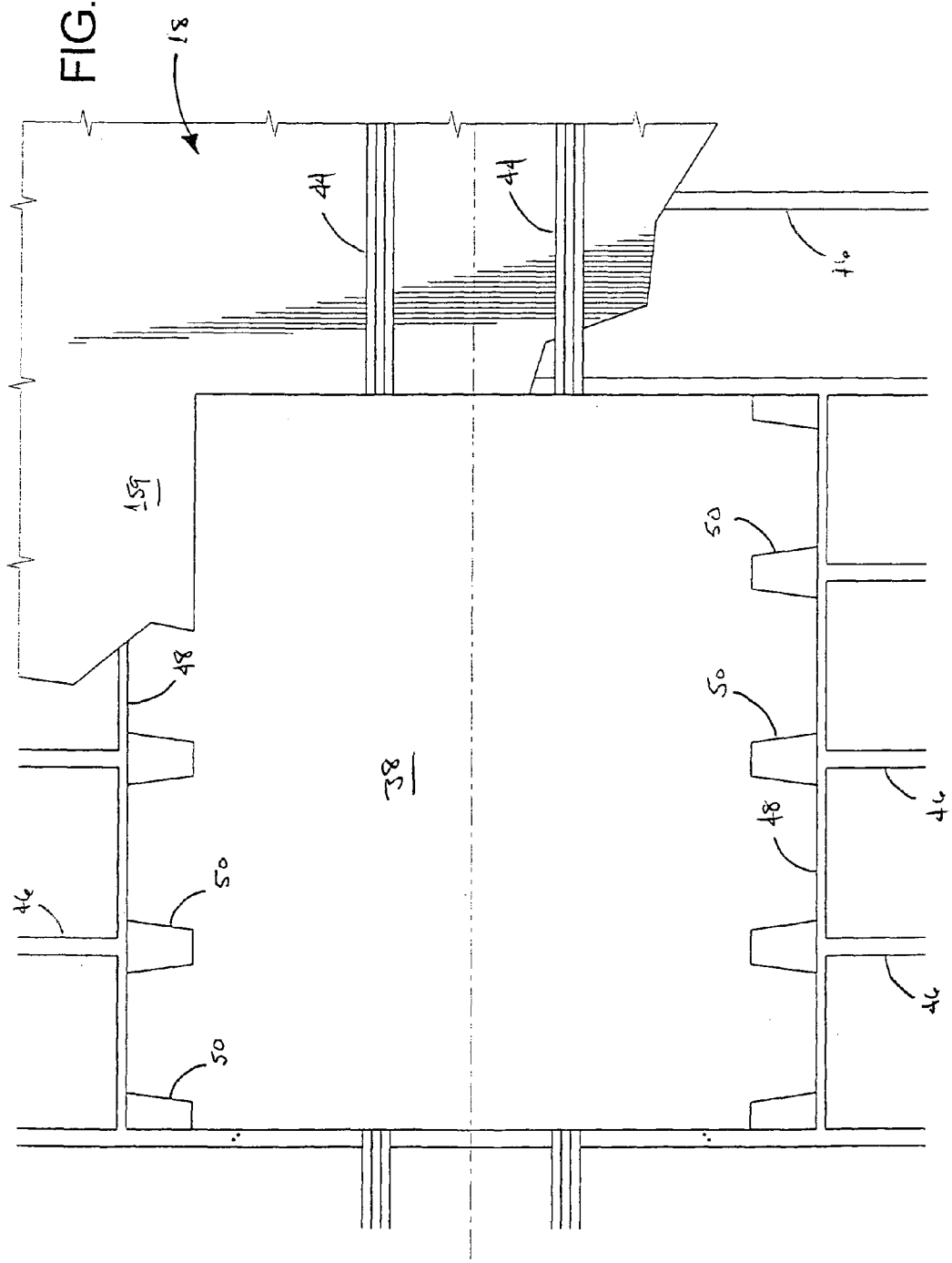

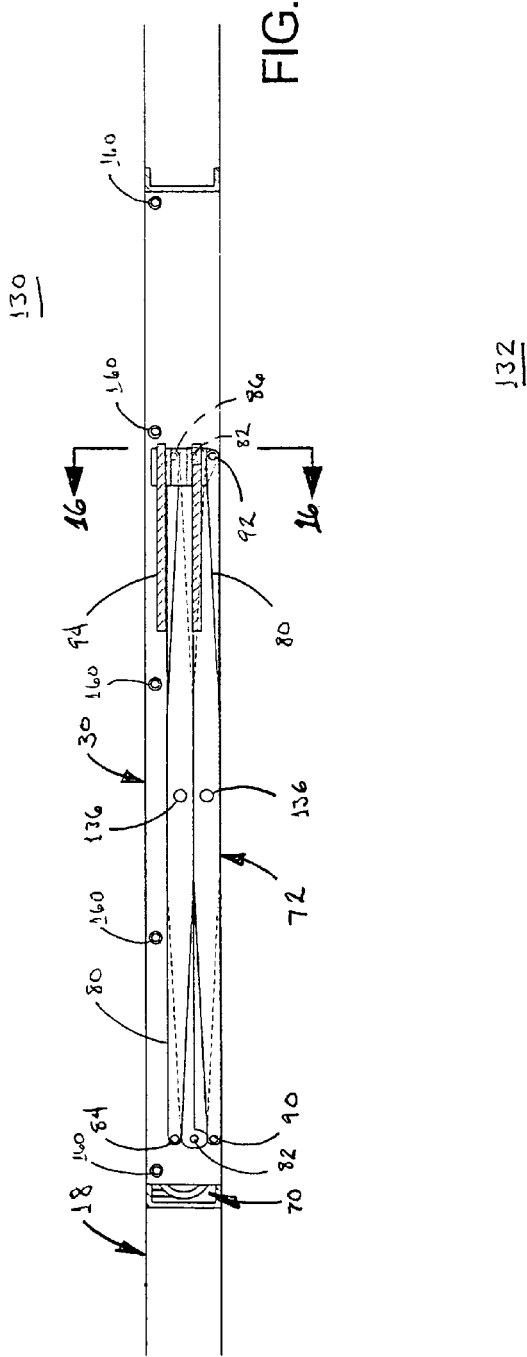

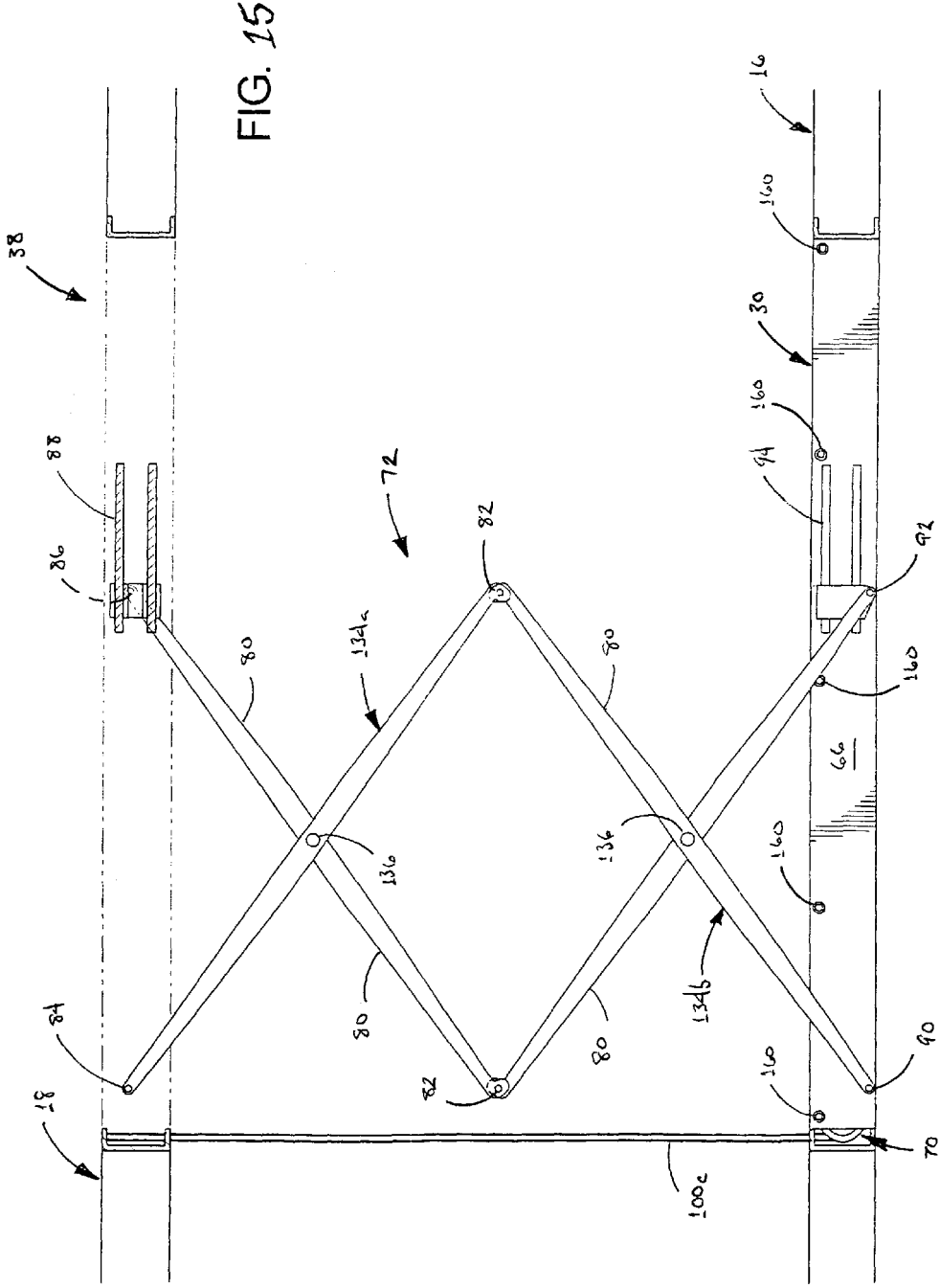

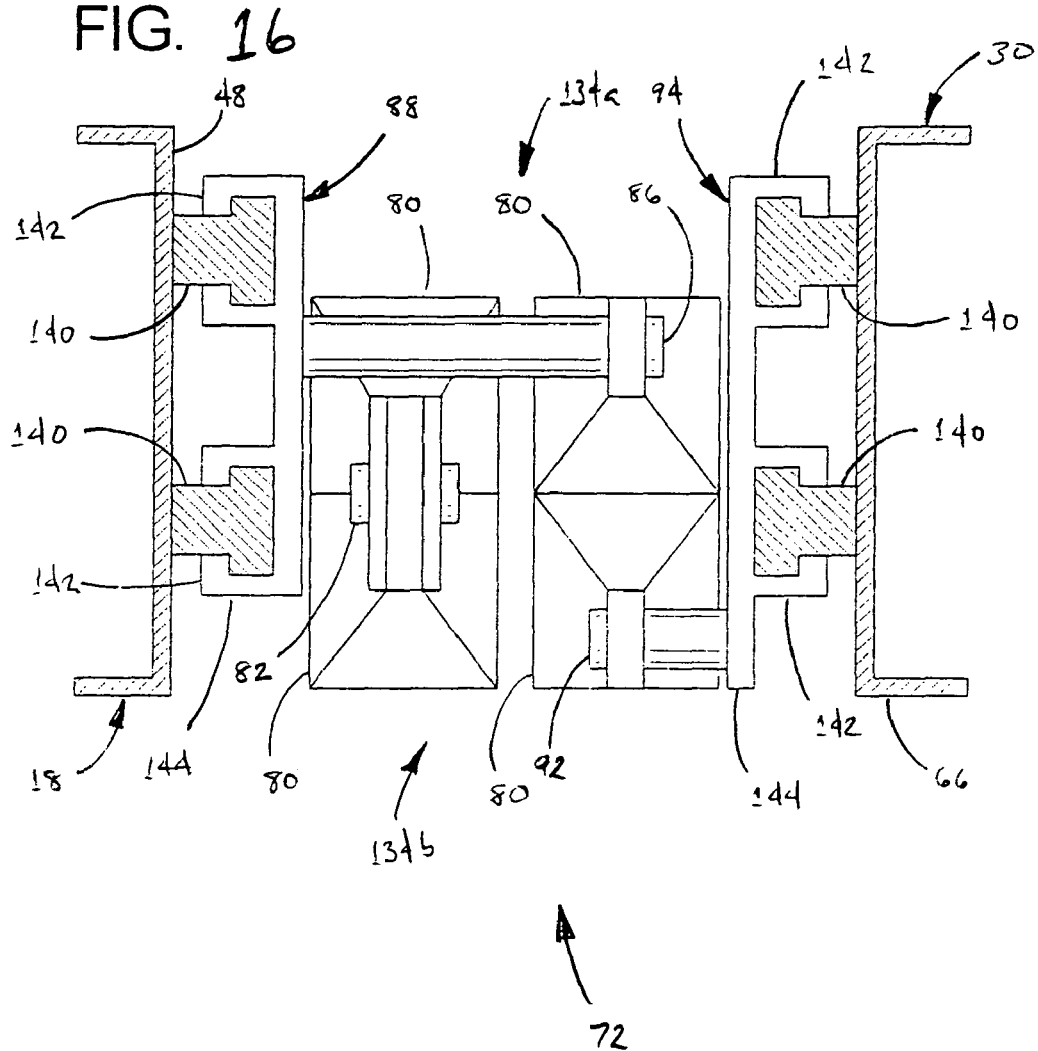

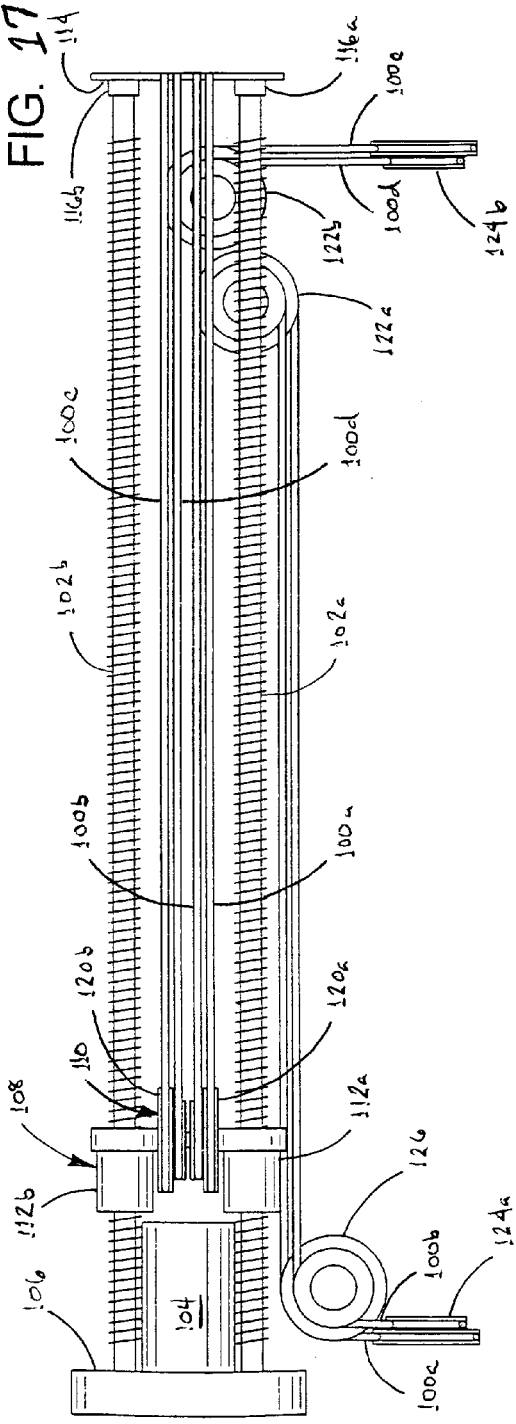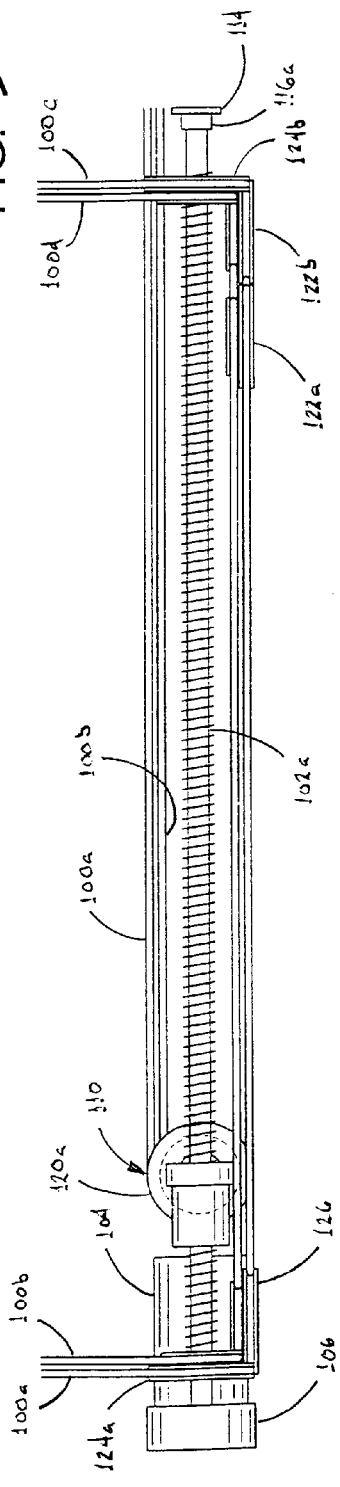

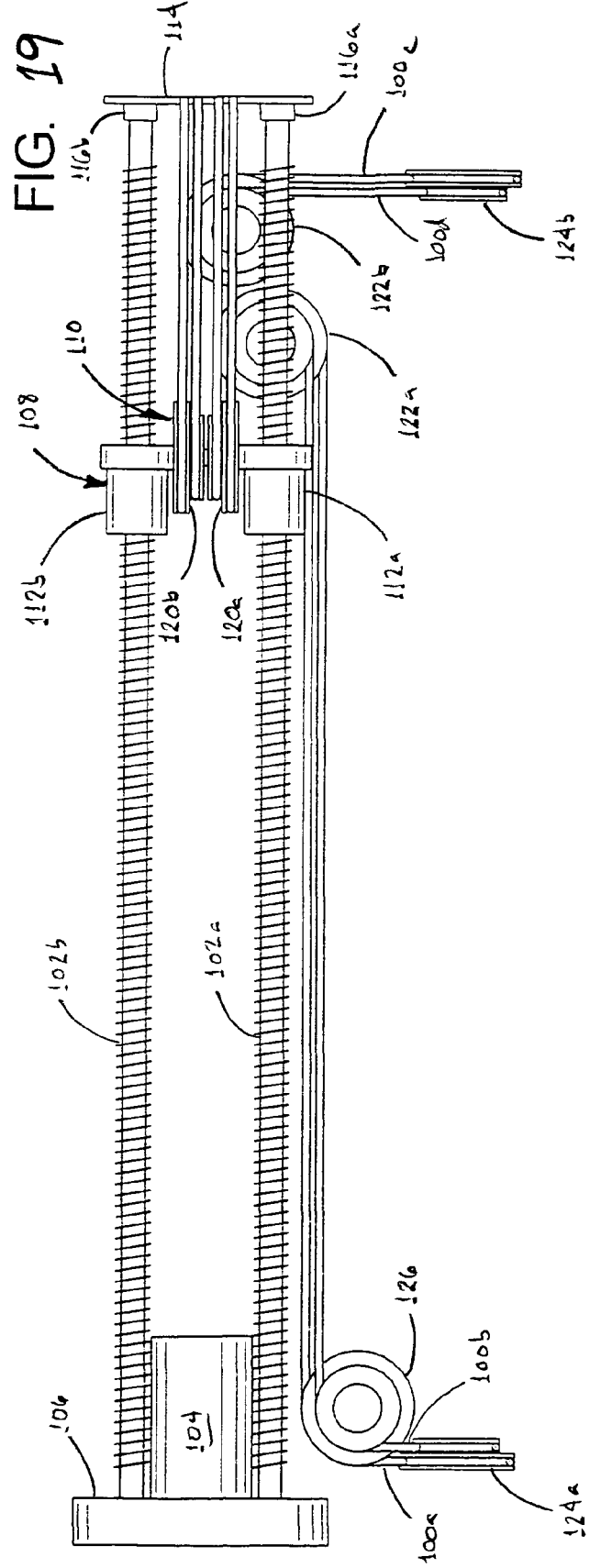

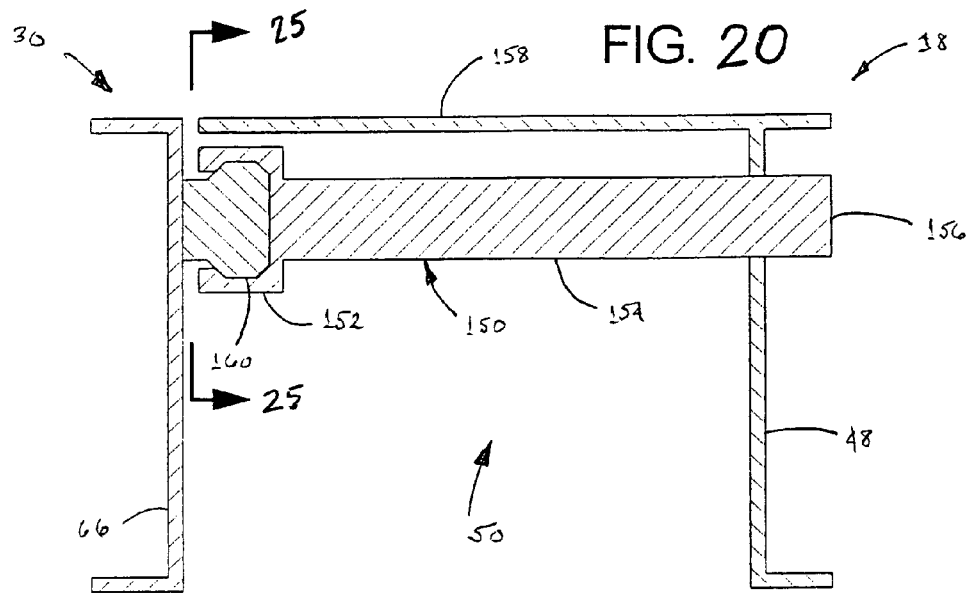
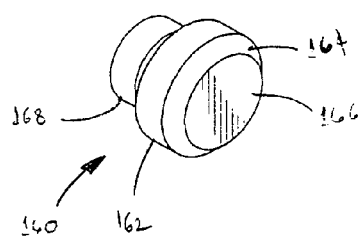
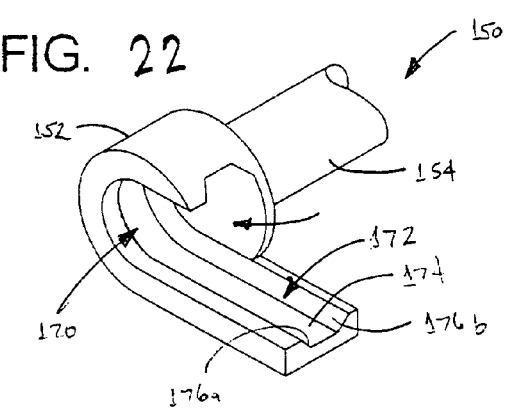
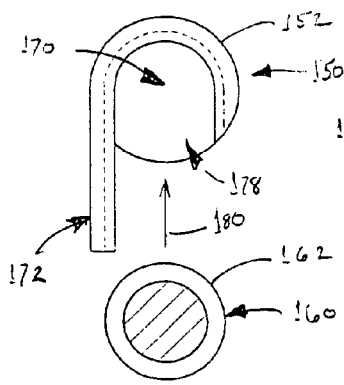
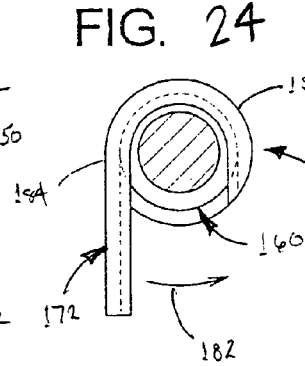

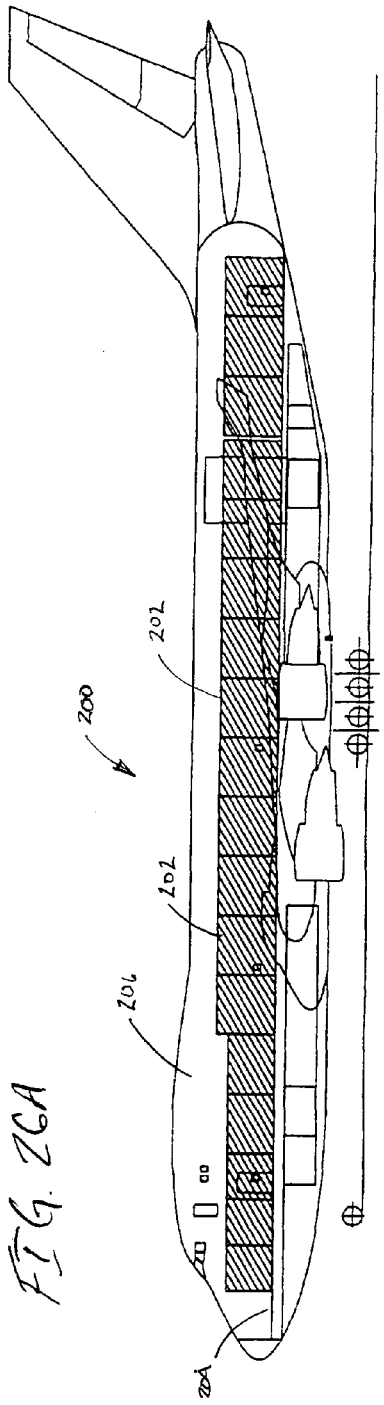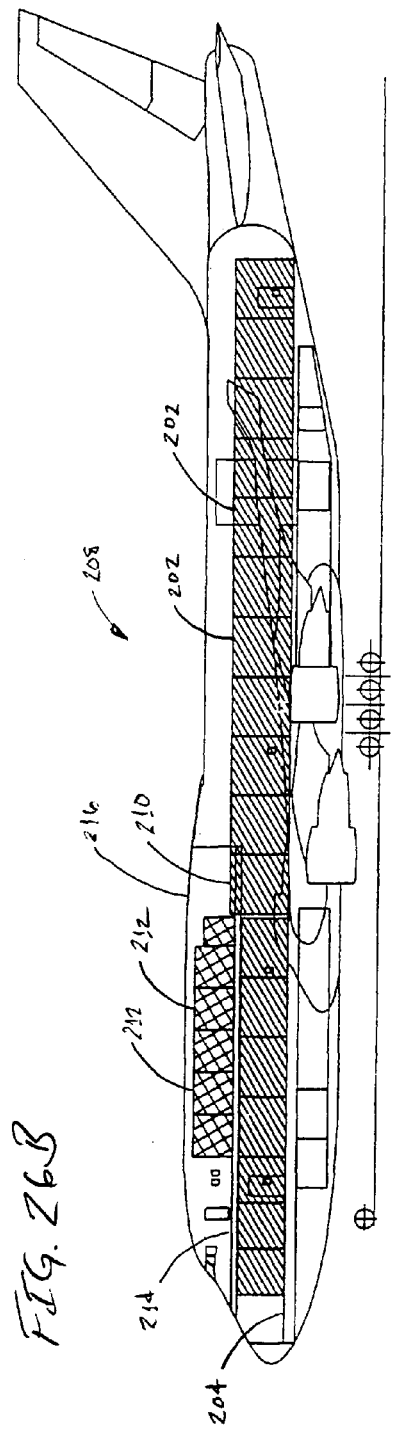

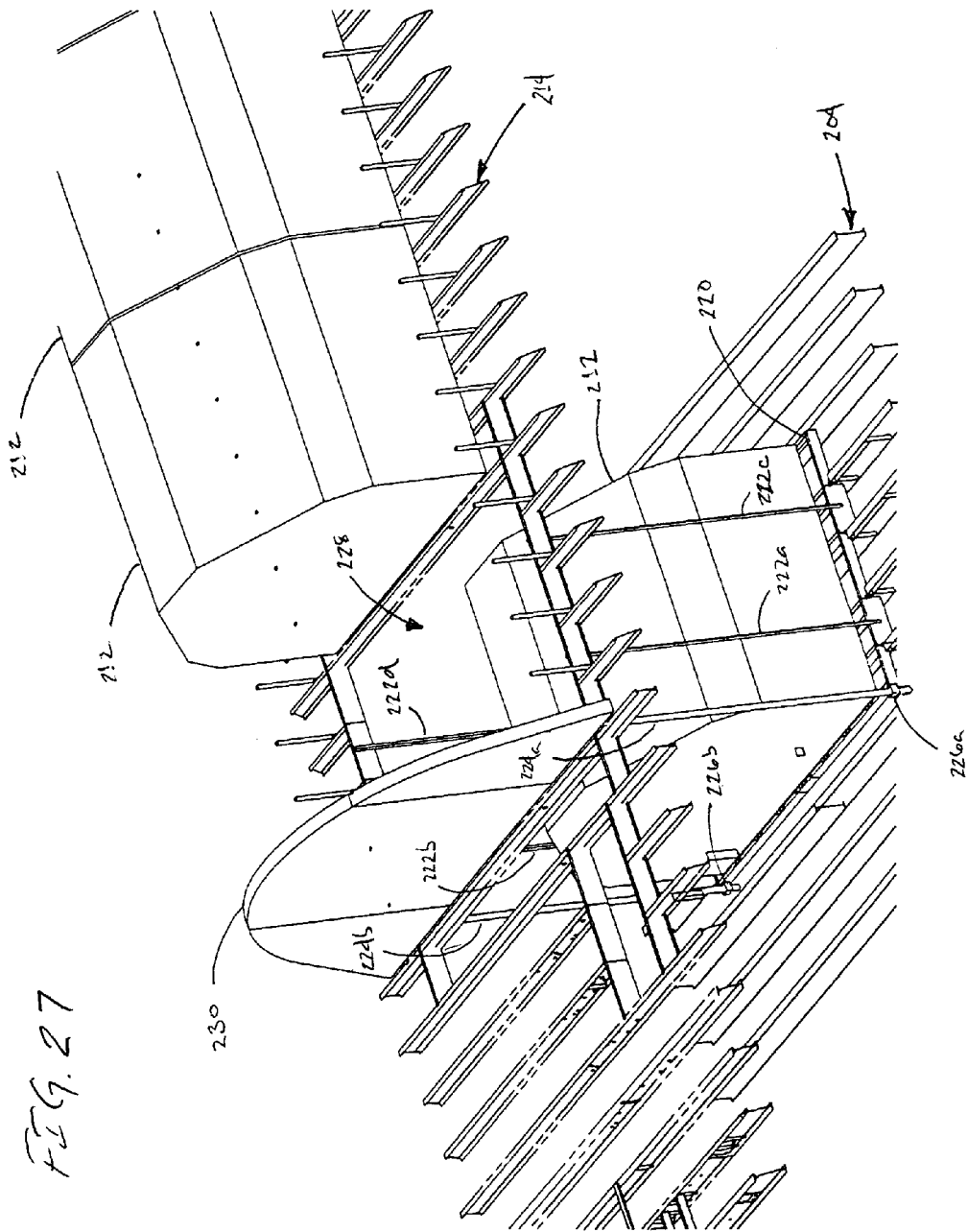

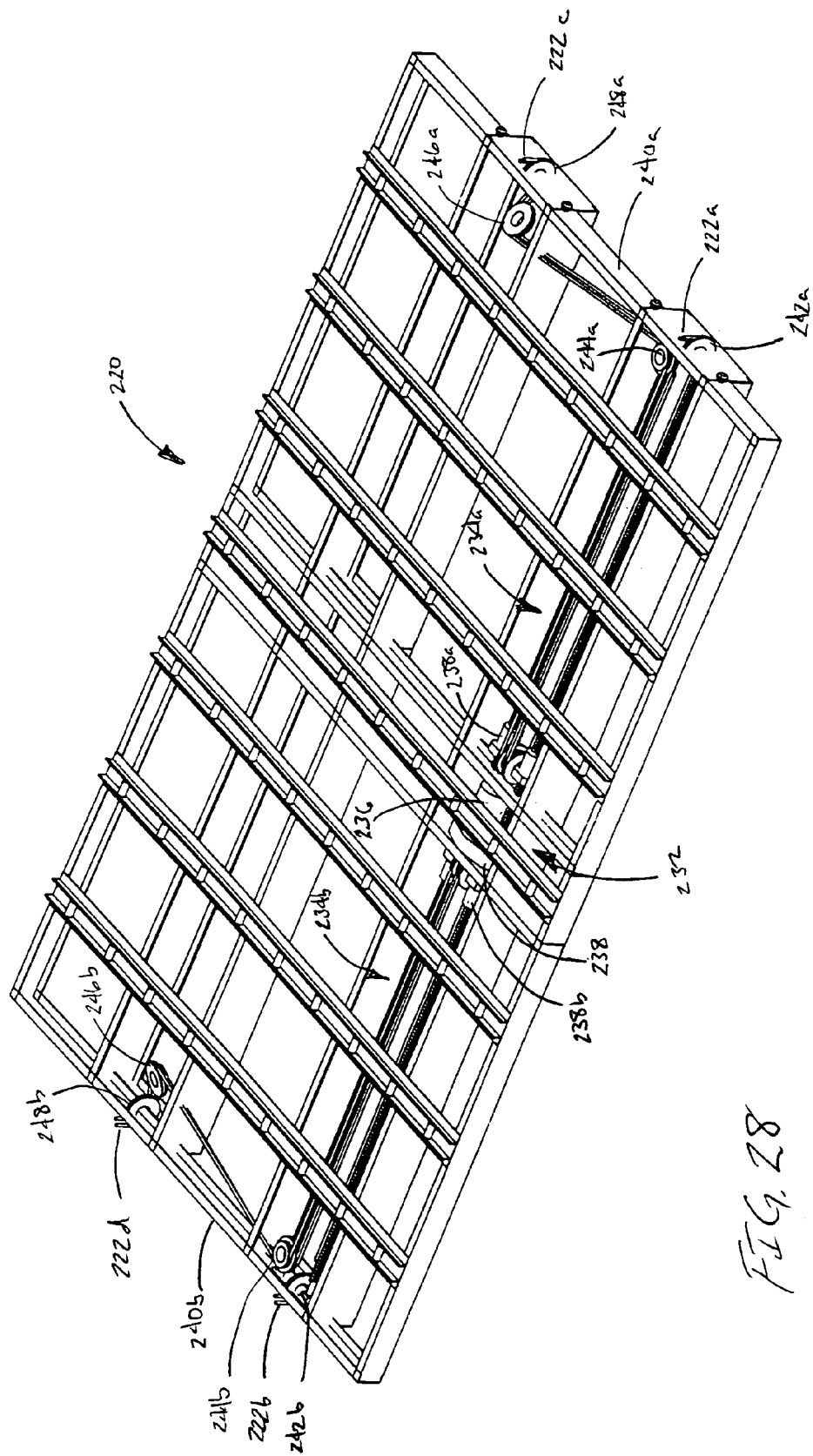

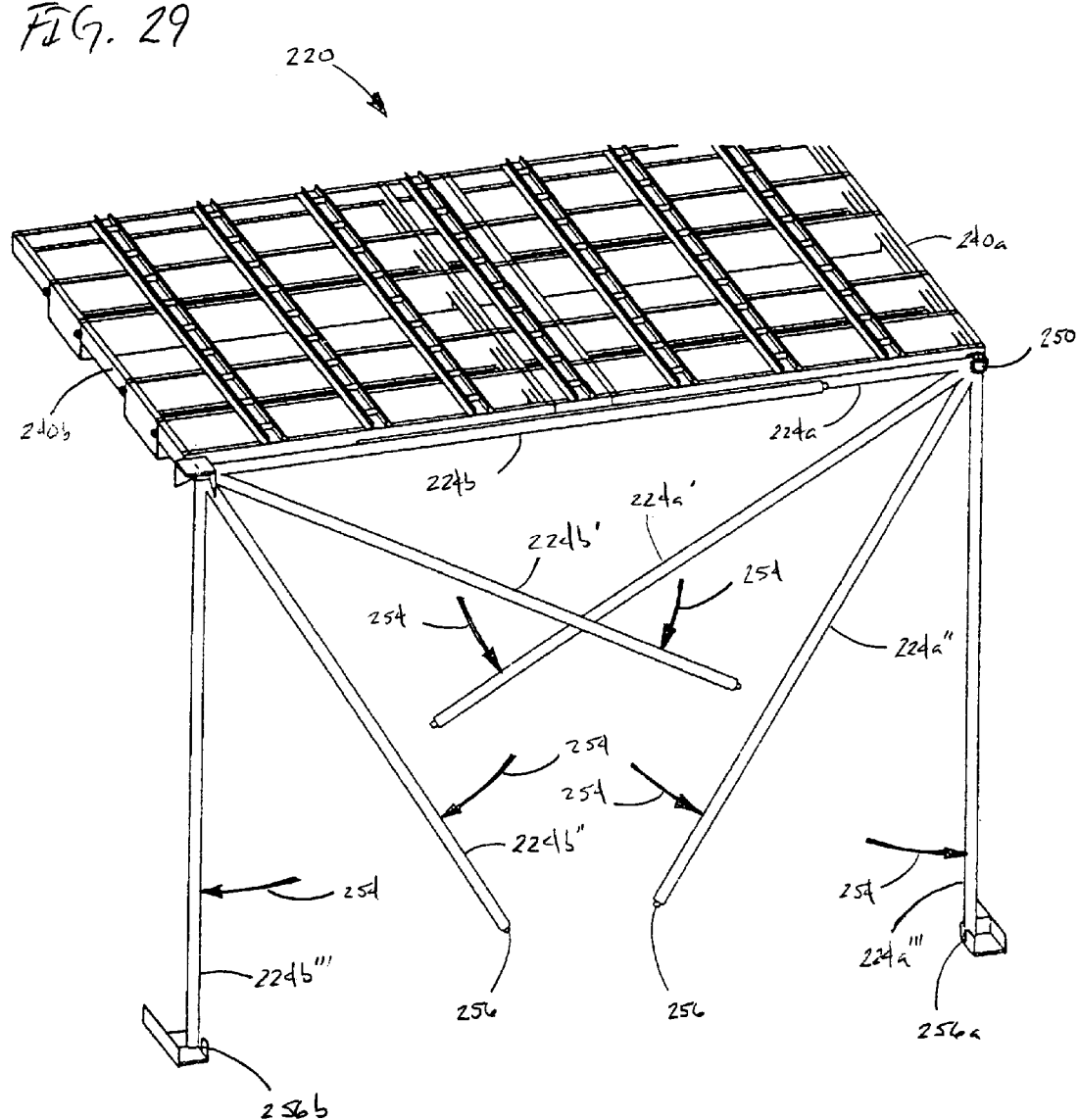

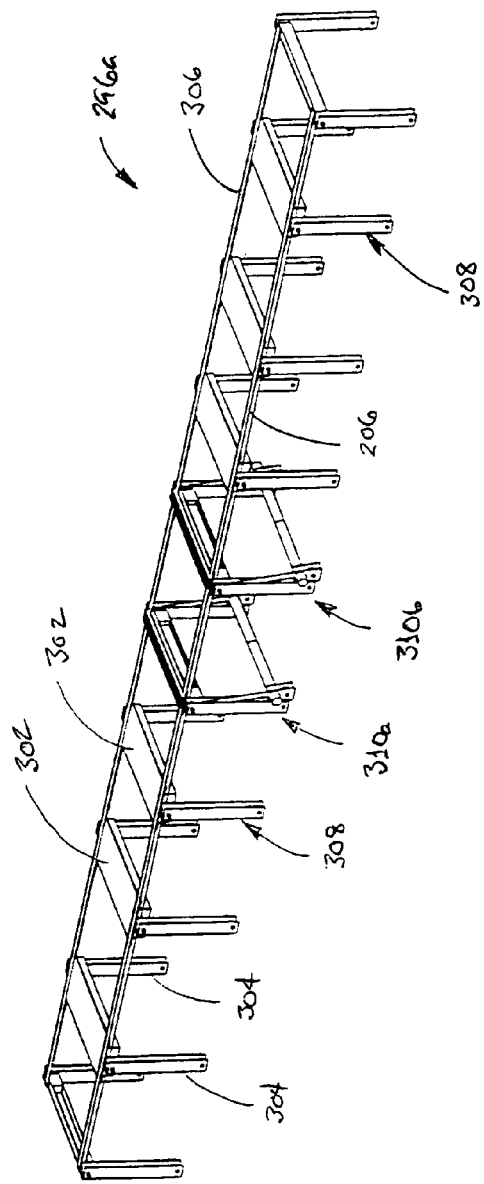
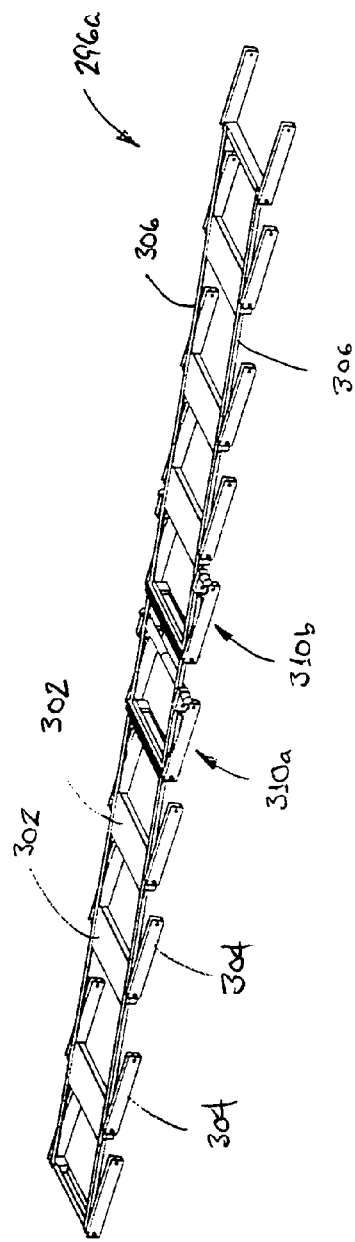
FIG. 35A
FIG. 35B

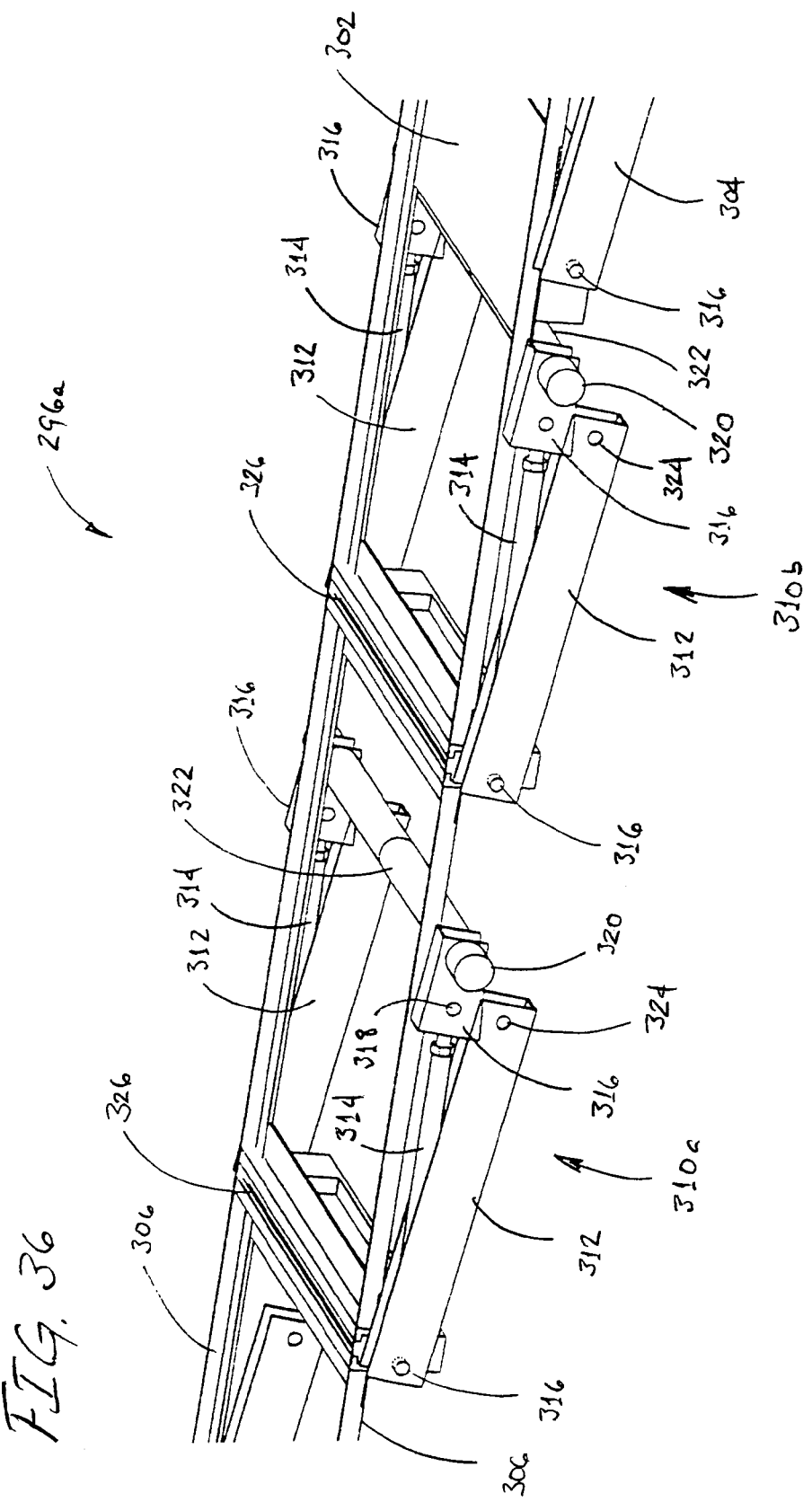

COMPACT CARGO LIFT FOR COMMERICAL AIRCRAFT

RELATED APPLICATIONS

This application claims the benefit of U.S. Provisional Patent Application No. 60/691,633 filed on 17 Jun. 2005.

BACKGROUND a. Field of the Invention

The present invention relates generally to cargo lifts for aircraft, and, more particularly, to an internal cargo lift for raising/lowering cargo between decks of an aircraft that allows for convenient and rapid conversion of passenger seating areas or other previously unusable areas to cargo carriage space and back.

b. Related Art

Historically, the commercial aircraft industry has distinguished between passenger and cargo aircraft, i.e., certain aircraft are dedicated to passenger travel while others are used solely for transportation of cargo. However, given the inflexibility inherent in dedicating an aircraft to one service or the other has become a significant problem with increasing competitiveness in the industry. A limited number of aircraft have been configured as "combis", that are able to carry a load of passengers and commercial cargo, but few of these have been flexible designs that allow the respective areas devoted to seating and cargo to be varied. Moreover, in those few cases where the configuration can be adjusted, conversion of the spaces has been exceedingly time-consuming and difficult.

A related problem is the difficulty in delivering the palletized cargo to the main (passenger) deck of the aircraft, even if this area is cleared of seating. In a passenger aircraft, cargo is ordinarily carried in palletized form in lower deck cargo compartments. Typically, there is a compartment fore and aft of the wing intersection/wheel well area, with each cargo compartment being serviced by a door on the lower lobe. Various types of ULDs (unit load devices) are carried in the compartments; depending on aircraft type and cargo, the ULDs may have a single line or "two abreast" configuration.

The advent of next-day delivery (and even same day delivery) of packages has increased the value of available cargo space. This is increasingly true in the case of regular passenger aircraft, due to the frequency of flights made to numerous destinations, as opposed to the hub-and-spoke operations to which classical daily/overnight freight operators have been wedded.

In some instances, an increased allowance for carry-on baggage has freed up lower deck cargo space and has allowed expanded cargo service on passenger aircraft. However, aircraft size (i.e., the number of seats) must be matched to the economics of a particular route. Thus, a bigger aircraft, with a larger lower lobe capacity, cannot be economically placed on a route if its seats are not also filled to an adequate extent. Thus, the ability to carry high-value extra cargo is still limited.

Removing a portion of the seating and carrying additional ULDs on the main deck is an attractive option, however, it has heretofore been largely impractical. Carriage of ULDs on the main deck has historically required adding a large cargo door in the upper part of the fuselage, allowing direct access to the main deck: this is a major structural modification, requiring extensive reinforcement, costs and regulatory approval difficulties which negate feasibility.

An alternative would be to transfer cargo from the lower lobe to the main deck (or to the two upper decks in the case of "double decker" jumbo aircraft), since the lower deck already has a cargo door, thus eliminating the requirement for a new main deck door. However, there has heretofore been no satisfactory mechanism for transferring ULDs from the lower lobe to the passenger deck/decks and vice versa. Moreover, the installation of such a mechanism, when modifying an existing passenger aircraft, presents the potential for structural, regulatory and cost problems similar to those involved in installing an upper deck cargo door.

In addition to passenger aircraft, related problems exist in certain dedicated cargo aircraft, notably double-decker "jumbo" aircraft that have been converted to full-time cargo use. For example, 747 cargo aircraft generally transport cargo on the main deck, that in conventional aircraft would carry passengers, but the difficulty in raising cargo to the upper deck in the forward position of the fuselage means that this part of the aircraft goes largely unused.

Accordingly, there exists a need for an apparatus for efficiently transferring cargo ULDs between the lower area and upper deck or decks of an aircraft, so as to obviate the need to add a large cargo door in the upper part of the fuselage. Furthermore, there exists a need for such an apparatus that does not require major structural modifications of the aircraft that would involve excessive expense and regulatory review. Still further, there exists a need for such an apparatus that, in itself, is comparatively economical, and that is physically compact so as to avoid significantly compromising the availability of space within the passenger and cargo areas of the aircraft. Still further, there exists a need for such an apparatus that is light in weight and does not require power systems that would add significant weight and cost to the aircraft in which the apparatus is installed. Still further, there exists a need for such an apparatus that operates with sufficient rapidity to avoid adding excessive time to loading/unloading operations and turnaround of the aircraft in service.

SUMMARY OF INVENTION

The present invention has solved the problems cited above, and is an apparatus for transferring cargo between an upper deck and a lower deck of an aircraft.

Broadly, the apparatus comprises: (a) a lift platform that is receivable in a through opening formed in the upper deck of the aircraft, the lift platform having an upper surface for supporting a load of cargo thereon; (b) means for lowering and raising the lift platform between the upper deck and the lower deck so as to transfers loads of cargo to and from the upper deck via the through opening; and (c) means for selectively attaching edges of the lift platform to the upper deck in load-bearing engagement therewith when the lift platform is raised and stowed in the through opening, so that the lift platform shares structural loading of the upper deck during flight operation of the aircraft.

The means for selectively attaching the edges of the lift platform to the upper deck in load-bearing engagement therewith may comprise means for selectively attaching first and second longitudinally extending side edges of the lift platform to first and second longitudinally extending side edges of the through opening, so that the lift platform shares structural loading of the upper deck in a lateral direction during flight operation of the aircraft. The means for selectively attaching the side edges of the lift platform to the side edges of the through opening may comprise at least one lock assembly on each of the side edges of the lift platform, each lock assembly comprising a first lock portion that is mounted to a longitudinal side edge of the lift platform, and a second lock portion that is mounted to a longitudinal side edge of the through opening for establishing load-bearing engagement with the first lock portion on the lift platform. The second lock portion may comprise a pin member that extends in a lateral direction from a side edge of the through opening, and the second lock portion may comprise a rotating latch that receives the pin member in lateral and vertical load-bearing engagement therewith.

The side edges of the through opening may span a plurality of truncated lateral beams of the upper deck, and the lift platform may comprise a plurality of lateral beams that span a width of the lift platform and that are aligned axially with the truncated beams of the upper deck when the lift platform is raised and stowed in the through opening. The at least one lock assembly may comprise a plurality of the lock assemblies, each lock assembly being located at an axial juncture between one of the truncated beams of the upper deck and one of the lateral beams of the lift platform when the lift platform is raised and stowed in the through opening.

The apparatus may comprise longitudinally extending header members that are mounted across the ends of the truncated beams of the upper deck and to intact lateral beams at forward and after ends of the through opening.

The means for lowering and raising the lift platform may comprise a lift mechanism having at least one lift cable, and a drive assembly for selectively extending and retracting the lift cable so as to lower and raise the lift platform, substantially the entirety of the drive assembly being housed within the lift platform. The drive assembly may comprise: an anchor point for an end of the at least one lift cable; at least one ball screw and nut in cooperating drive engagement, the ball nut being located a spaced distance from the anchor point, at least one pulley mounted to the ball nut, the lift cable being routed over the pulley from the anchor point;, and a motor for reversibly rotating the ball screw, in a first direction that shortens the distance between the pulley and the anchor point so as to extend the cable from the lift platform, and in a second direction that increases the distance between the pulley and the anchor point so as to retract the cable into the lift platform. The at least one ball screw and nut may be mounted to extend generally horizontally within an interior height of the lift platform.

The apparatus may further comprise means for stabilizing the lift platform as the lift platform is lowered and raised between the upper and lower decks of the aircraft. The means for stabilizing the lift platform may comprise first and second scissors-action stabilizer assemblies on longitudinally extending sides of the lift platform, each stabilizer assembly comprising at least one pair of rigid arm members joined in an X-shaped configuration by a central pivot point, first and second upper attachment points on the arm members that are pivotably mounted to the upper deck of the aircraft, and first and second lower attachment points on the arm members that are pivotably mounted to the longitudinally extending sides of the lift platform.

The first and second attachment points on the arm members may each comprise a stationary pivot connection, and a sliding pivot connection that accommodates increases and decreases in distance between the first and second attachment points as the lift deck is raised and lowered. The sliding pivot connections may each comprise: at least one guide rail that extends in a substantially horizontal direction; a bracket member having at least one channel portion that receives the guide rail in sliding engagement therewith, so that the bracket member is free to slide horizontally while being supported vertically; and a pivot connection joining an end of one of the rigid leg members to the bracket member.

The apparatus may further comprise first and second spaces formed intermediate the longitudinally extending side edges of the lift platform and longitudinally extending edges of the through opening, in which the rigid leg members of the stabilizing assembly nest when the lift platform is raised and stowed in the through opening.

The apparatus may further comprise a recess in the lower deck of the aircraft for receiving the lift platform therein, so that the upper surface of the lift platform extends substantially flush with an upper surface of the lower deck when the lift platform is lowered therein. The recess in the lower deck of the aircraft may comprise an area of the lower deck of the aircraft in which upper edges of floor frames have been removed so as to form the recess therein.

The apparatus may further comprise a translating floor assembly mounted in the area of the recess in the lower deck of the aircraft, the translating floor assembly having a first position which defines a floor surface that extends over the recess generally flush with the upper surface of the lower deck, and a second position which clears the recess for receiving the lift platform in the lower deck of the aircraft. The translating floor assembly may comprise a plurality of folding floor sections, each of the folding floor sections comprising: a laterally-extending frame that is received in an intercostal space intermediate the floor frames of the lower deck; at least one deck segment mounted to the frame for extending substantially flush with the upper surface of the lower deck when the frame is in a raised position; a plurality of folding leg members, each leg member having an upper end that is pivotably mounted to the frame and a lower end that is pivotably mounted to the lower deck in the intercostal space intermediate the floor frames; and means for selectively pivoting the leg members between a generally vertical orientation in which the frame is supported substantially flush with the surface of the lower deck, and a generally horizontal orientation in which the frame is dropped into the intercostal space so as to clear the recess to receive the lift platform in the lower deck. The means for selectively pivoting the leg members may comprise: at least one actuation link having an upper end that is mounted to an upper end of one of the folding leg members, and a lower end that is mounted to an actuation arm; a torque tube that is mounted to the actuation arm; and means for reversibly rotating the torque tube in a first direction such that the actuation link draws the leg member to the vertical orientation, and a second direction such that the actuation link lowers the leg member to the generally horizontal orientation.

In a preferred embodiment, the present invention provides an apparatus for transferring cargo between an upper deck and a lower deck of an aircraft, comprising: (a) a through opening in the upper deck of the aircraft, the through opening comprising first and second longitudinally extending side edges formed across ends of a plurality of truncated lateral beams of the upper deck, and first and second longitudinal headers mounted across the ends of the truncated lateral beams and to intact lateral beams forward and aft of the through opening; (b) a lift platform that is receivable in the through opening in the upper deck, the lift platform comprising an upper surface for supporting a load of cargo thereon, and first and second longitudinally extending side edges that are positioned generally adjacent to the side edges of the through opening when the lift platform is in the raised position; (c) a drive assembly for selectively raising and lowering the lift platform between the upper deck and the lower deck so as to transfer loads of cargo to and from the upper deck via the through opening, the drive assembly comprising a motor and drive mechanism that are substantially entirely housed within the lift platform; (d) means for stabilizing the lift platform as the lift platform is lowered and raised between the upper deck and the lower deck of the aircraft; and (e) a locking assembly for attaching the longitudinally extending side edges of the lift platform to the side edges of the through opening in load-bearing engagement therewith when the lift platform is stowed in the through opening, so that the lift platform shares structural loading of the upper deck in a lateral direction during flight operation of the aircraft, the locking assembly comprising at least one locking unit for attaching each longitudinal edge of the lift platform to a longitudinal edge of the through opening, each locking unit having a first lock portion mounted on the edge of the lift platform, and a second lock portion mounted on the header at the edge of the through opening for establishing load-bearing engagement with the first lock portion on the lift platform.

The present invention also provides an aircraft having apparatus for transferring cargo between an upper deck and a lower deck thereof, the aircraft comprising: (a) a through opening formed in the upper deck; (b) a lift platform that is receivable in the through opening, the lift platform having an upper surface for supporting a load of cargo thereon; (c) means for lowering and raising the lift platform between the upper deck and the lower deck so as to transfers loads of cargo to and from the upper deck via the through opening; and (d) means for selectively attaching edges of the lift platform to the upper deck in load-bearing engagement therewith when the lift platform is raised and stowed in the through opening, so that the lift platform shares structural loading of the upper deck during flight operation of the aircraft.

These and other features and advantages of the present invention will be more fully understood and appreciated from a reading of the following detailed description with reference to the accompanying drawings.

BRIEF DESCRIPTION OF THE DRAWINGS

FIG. 1 is an elevational view of an exemplary aircraft having a cargo lift assembly in accordance with the present invention installed therein, the fuselage thereof being partially cut away so as to show the location of the lift assembly relative to the main cargo and passenger areas of the aircraft;

FIG. 2 is a partial cutaway view of the aircraft of FIG. 1, showing the relationship of the cargo lift assembly to the cargo and main decks of the aircraft when the main deck is used solely for passenger seating;

FIGS. 3-5 are sequential cutaway views, similar to FIG. 2, showing the steps in operating the lift assembly of the present invention to raise/lower cargo ULDs between the lower lobe and the passenger deck of the aircraft;

FIG. 12 is a top, plan view of the cargo lift of FIGS. 1-5, viewed along line 12-12 in FIG. 5, showing the relationship of the drive and support mechanisms of the assembly when in the raised position;

FIG. 13 is a top, plan view of the passenger deck of the aircraft, similar to FIG. 12, with the cargo lift assembly being removed to show the cooperating deck structure in greater detail;

FIG. 14 is a side, cross-sectional view, taken along line 14-14 in FIG. 12, showing the relationship of the scissors-action support components of the cargo lift when in the retracted position;

FIG. 15 is a side, cross-sectional view, similar to FIG. 14, showing the configuration of the scissors-action support mechanism of the lift assembly when in the lowered position;

FIG. 16 is an enlarged, cross-sectional view, taken along line 16-16 in FIG. 14, showing the relationship of the arms of the scissors action support mechanism when the lift assembly is in the retracted position;

FIG. 17 is a top, plan view of the screw-driven pulley mechanism and cables that raise and lower the cargo lift assembly of FIGS. 1-16;

FIG. 18 is a side, elevational view of the screw-driven pulley mechanism of FIG. 17, showing the relationship of the components when in the lowered position;

FIG. 19 is a second top, plan view of the screw-driven pulley mechanism of FIGS. 17-18, showing the relationship of the components when in the raised position;

FIG. 20 is a side, cross-sectional view, taken along line 19-19 in FIG. 12, showing one of the locking mechanisms which mates the deck of the cargo lift with the main deck of the aircraft when in the raised position;

FIG. 21 is a perspective view of the load-bearing pin of the locking mechanism of FIG. 20, showing the configuration thereof in greater detail;

FIG. 22 is a perspective view of the rotating coupler of the locking mechanism of FIG. 20, showing the configuration thereof in greater detail.

FIG. 23 is an end, elevational view of the load-bearing pin and coupler of FIGS. 21-22, showing the manner in which the pin is received within the coupler in response to the deck being raised to the passenger deck of the aircraft;

FIG. 24 is a second end, elevational view of the load-bearing pin and coupler of FIGS. 21-22, showing the manner in which the coupler is rotated relative to the pin once the latter has been received therein;

FIG. 25 is a third end, elevational view of the load-bearing pin and rotating coupler of FIGS. 21-22, showing the relationship thereof when the coupler has been rotated to the locked position, so as to retain the cargo lift in its raised orientation, level with the main, passenger deck of the aircraft;

FIG. 26A is an elevational, cut-away view of a wide-body "jumbo" cargo aircraft, showing the manner in which cargo is ordinarily carried on the main deck thereof but not on the upper deck;

FIG. 26B is a second elevational, cut-away view of the aircraft of 26A, showing the manner in which a cargo lift in accordance with a second embodiment of the present invention allows cargo to be carried on the upper deck thereof, increasing the economic viability of an increased capacity conversion of the aircraft;

FIG. 27 is a perspective view of the main and upper decks of the double-decker "jumbo" freight aircraft of FIG. 26B, showing the manner in which the lift apparatus in accordance with the second embodiment of the invention raises cargo from the main deck to the upper deck thereof;

FIG. 28 is a perspective view of the lift platform of the lift apparatus of FIG. 27, with the floor of the platform being removed to show the internal mechanism thereof in greater detail;

FIG. 29 is a second elevational view of the lift platform of FIG. 28, showing the manner in which the leg members thereof pivot downwardly and engage fittings in the lower deck to provide vertical guides that stabilize the platform as it is lowered and raised;

FIGS. 35A-B are perspective views of one of the folding sections of the translating floor assembly of FIGS. 33-34, showing the section in its raised and lowered configurations, respectively; and FIG. 36 is an enlarged perspective view of the central portion of the folding floor section of FIGS. 35A-B, showing the actuating mechanism thereof in greater detail.

DETAILED DESCRIPTION

Figure 4:
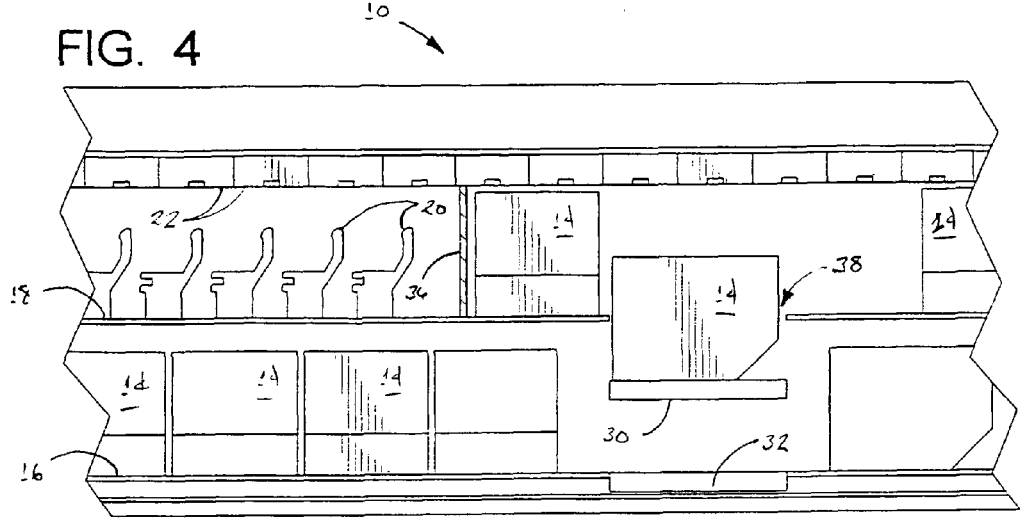

FIG. 1 shows an exemplary wide-body aircraft 10 having a lift assembly 12 installed therein, permitting the aircraft to carry cargo in ULDs 14 on both the cargo and main (passenger) decks 16, 18. As will be explained in greater detail below, the lift assembly is preferable installed in the aft portion of the aircraft, as shown in the figures. FIGS. 2-5, in turn, illustrate the basic operation of the system.

As used in this description and the appended claims, the term "lower deck" refers to a first deck on which cargo is positioned, and the term "upper deck" refers to a second deck above the first, to and/or from which the cargo is transferred by the lift apparatus of the present invention. One may be a dedicated cargo deck and the other primarily a passenger deck, as shown in FIGS. 1-5, or they may both be primarily cargo or passenger decks, particularly in the case of double-decked "jumbo" aircraft (e.g., a Boeing 747 or Airbus A380).

Accordingly, FIG. 2 shows the aircraft in its ordinary, passenger-carrying configuration, with the interior of the upper lobe 24 devoted to seating 20 and overhead storage bins 22, and with carriage of ULDs 14 being confined to the lower lobe 26.

As can be seen, the lift assembly 12 includes a lift platform 30 that is received within an opening in the main deck 18, so that when stowed its upper surface lies flush with the deck so that passenger seats 20 can be mounted thereon. As will be described in greater detail below, the mechanism of the lift apparatus is essentially self-contained within the lift platform 28; no exterior devices encumber the interior of the aircraft when the apparatus is installed. Moreover, when in the stowed position, the lift platform attaches structurally to the main deck 18 so as to form load-bearing component thereof, so that the structural impact to the aircraft (from its unmodified condition) is minimal. As will also be described in greater detail below, a cut-out 32 is formed in the floor of the cargo deck 16 to receive the platform when it is lowered, the cutout being spanned by removable tracks 34 when the lift platform is stowed in the raised position.

To prepare the upper lobe for cargo use, a selected number of seats 20 are removed and a divider panel 36 is installed between the passenger and cargo areas of the upper deck. Owing to the limited vertical height of the ULDs, the overhead storage compartments can remain in place, greatly simplifying and expediting the conversion. In the lower lobe, in turn, the tracks 34 are removed so that the lift platform 30 can be lowered to position in which its upper surface is flush with that of the cargo deck 16, as shown in FIG. 3. As the lift platform is lowered, a through opening 38 is vacated in the main deck 18.

The ULDs are loaded/unloaded in the lower lobe through the main loading door (not shown) with which the aircraft was originally equipped. The ULDs/pallets are then moved longitudinally through the hold on tracks (not shown) on deck 16, which again are an original part of the aircraft. The upper surface of the lift platform 30 may be provided with corresponding track segments that align with those on the cargo deck when the lift is in the lowered position, so that the ULDs 14 can be transported thereover, e.g., to the position of the right-most ULD in FIG. 3. ULDs can also be stopped atop the lift platform in the position shown in FIG. 3, in preparation for being raised to the main passenger deck 18.

Figure 5:
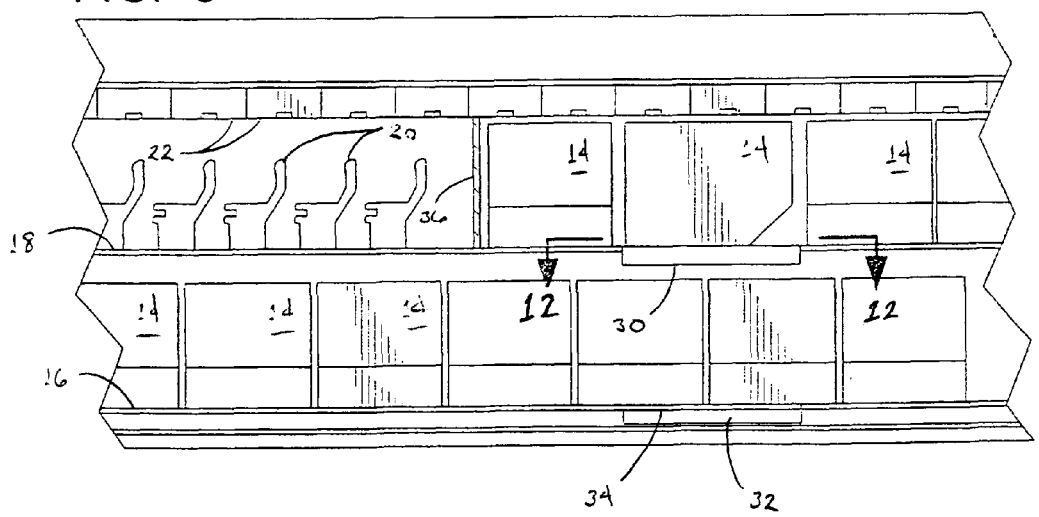

With a ULD in position on the lift platform, the internal mechanism of the platform is actuated to raise/lower the ULD through the opening 38 in the main deck, in the manner shown in FIG. 4. When the platform reaches the raised position so that its upper surface is flush with that of the main deck 18, the pallet is moved off of the platform, in a forward direction towards the divider panel 36, or in a rearward direction towards the tail of the aircraft. The tracks remaining from the removed seats may be employed to support the ULDs for movement through the passenger cabin. The final pallet/ULD can remain in position atop the lift platform when the latter is locked in its raised position, as shown in FIG. 5. The track segments 34 are then reinstalled over the floor cutout 32 and additional cargo containers are moved into place in the area below the raised lift platform 30; since the supports and drive mechanisms are self-contained, there are no obstructions below the platform that would interfere with passing/storing cargo containers thereunder. Unloading the aircraft using the cargo lift assembly is essentially the reverse of the loading process, lowering the ULDs from the passenger deck 18 and then passing them through the cargo hold and out the main loading door in a conventional manner.

As shown, the lift assembly is preferably installed in the aft portion of the aircraft, but forward of the rear passenger door. Positioning the lift forward of the door avoids a "log jam" situation that could interfere with traffic flow, while rearwardly of the door the fuselage typically tapers in a manner that would impose impractical geometry and space restrictions. Furthermore, the barrier panel can be positioned as far forward as desired, without separating the passengers from the crew or from the main passenger-loading door at the front of the aircraft.

Since the lifting and stabilizing mechanisms are all contained within the lift platform and the associated deck opening, very little modification of the aircraft is required to install the system. The main modification is to cut the through opening in the passenger deck 18; as is described in greater detail below, the lift deck is tied structurally to the main deck when in the stowed position, so that there is virtually no loss or compromise of structural integrity due to the opening 38. The receiver opening 32 in the lower deck does not affect structural integrity either, since the portion of the frames that is removed does not serve a structural purpose with respect to the aircraft body and is only provided to support the overlying floor surface. Finally, power requirements are met by simply connecting an electrical cable to the platform, to supply electrical power to the motor that is housed therein, and there is no need to add expensive and complicated hydraulics.

Figure 6:
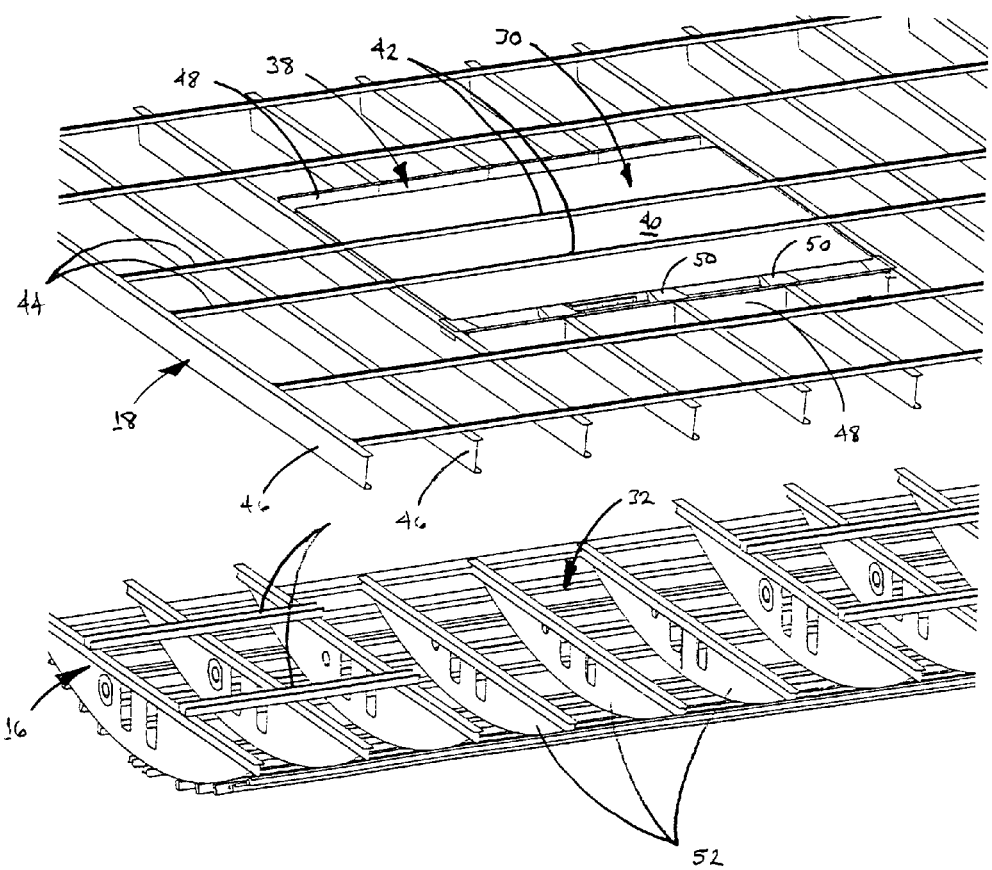
FIG. 6 is an enlarged, perspective view of the cargo lift assembly of FIGS. 1-5, showing its relationship to the cargo and main decks of the aircraft in greater detail.
Figure 7:
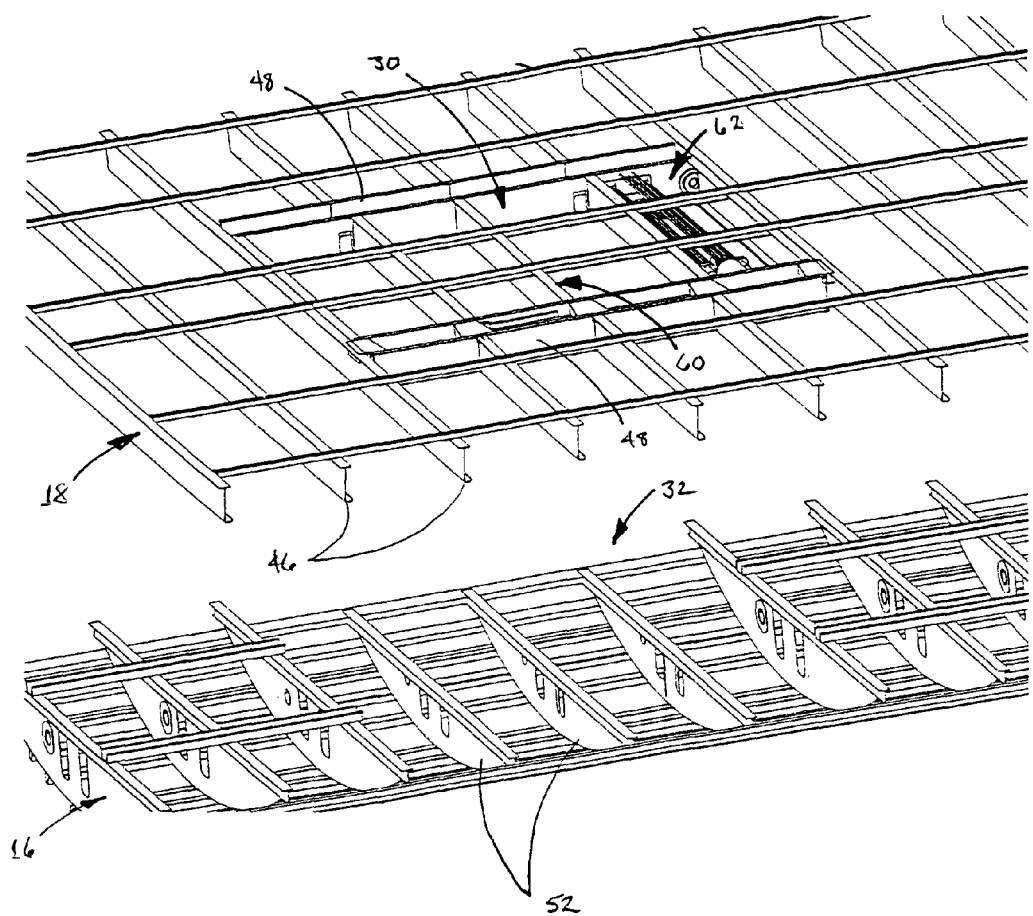
FIG. 7 is a perspective view of the cargo lift assembly of FIG. 6, with the upper floor surface of the lift platform being removed so as to shown the position of the internal drive mechanism thereof in greater detail.

FIGS. 6-7 show the relationship of the lift platform to the main and cargo decks in greater detail. As can be seen in FIG. 6, the lift platform 30 nests closely within the opening 38 when in the raised position, with its upper surface lying flush with that of the passenger deck 18 as noted above. First and second track segments 42 align with corresponding tracks 44, (e.g., conventional seating tracks) on the surface of the passenger deck, and may be used for moving ULDs/cargo off and onto the lift platform 30.

The through opening 38 in the deck itself is formed by cutting an area out of the floor and deck support beams 36, and then installing headers 48 that join the severed beam ends to the uncut beams at the forward and rearward ends of the opening. Locking mechanisms 50 are mounted at the inboard sides of the headers, at the location of each cut beam, for forming a structural engagement between the platform and the deck, as will be described in greater detail below.

The lower opening 32, in turn, is formed by cutting down the upper edges of corresponding floor frames 52, to a height that generally matches that of the lift platform 30 so that the upper surface of the latter will be level with the floor of the cargo deck 18 when the platform is in the lowered position; as noted above, this does not compromise the structural integrity of the aircraft, since the upper edges of the floor frames only support the floor panels and tracks of the cargo compartment, rather than serving a load carrying function with respect to the fuselage. Tracks 54 are mounted to the cargo deck floor and align with the removable track segments when the latter are in place.

Figure 8:
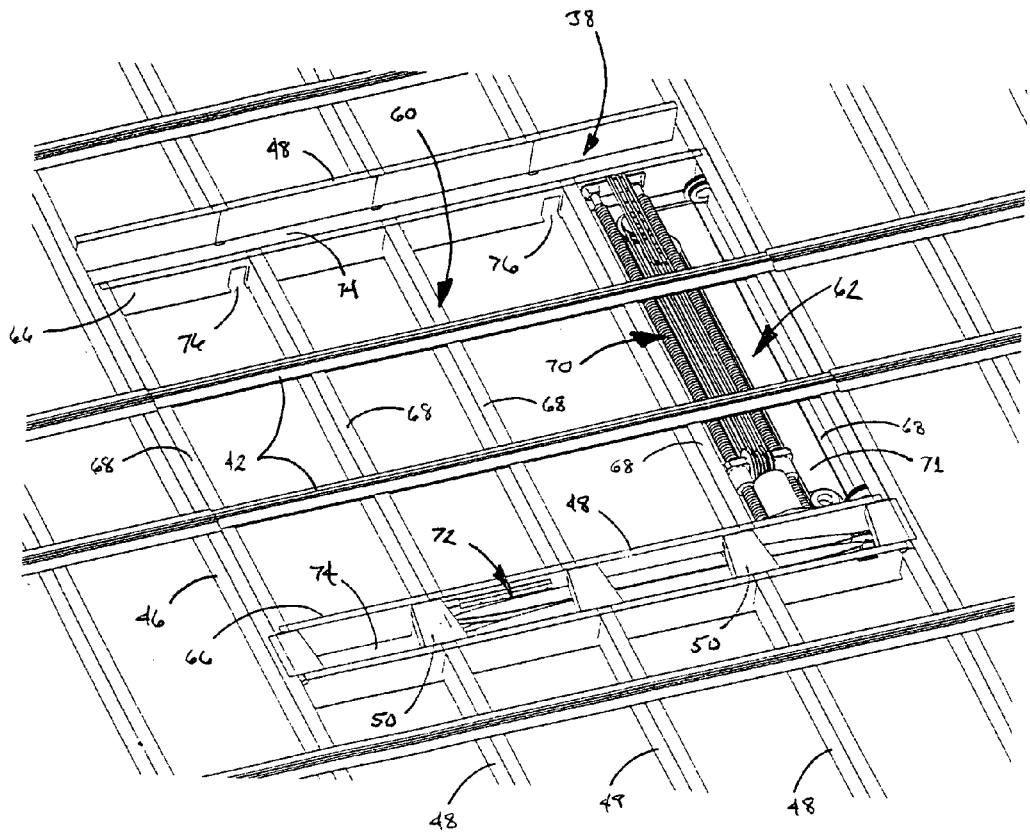
FIG. 8 is a perspective view of the cargo lift assembly of FIGS. 6-7, viewed from a higher angle so as to shown the internal components thereof in greater detail.

As can be seen in FIGS. 7-8, the lift platform includes a frame 60 within which the entire operating mechanism 62 of the lift apparatus is mounted. Consequently, when in the stowed position, the lift platform essentially forms a part of the main passenger deck, with no obstructions projecting into the overlying or underlying spaces.

The frame 60 is substantially rectangular in outline, with longitudinally-extending side beams 66 that are joined by a series of transverse beams 68; as can be seen in FIG. 8, each of the transverse beams 68 is aligned axially with one of the transverse deck beams 48, so that when the lift platform is in the raised and locked position, the transverse beams of the platform correspond to and substitute structurally for the segments of the deck beams that were removed in the formation of the lift opening 38.

As can be seen with further reference to FIG. 8, the actuating mechanism 70 is mounted across one end of the frame 60, within the vertical and horizontal space 71 defined by the side beams 66 and two of the transverse beams 68. First and second scissors-action stabilizing mechanisms 72 (one only being shown in FIG. 8) are mounted along the longitudinal sides of the frame, in the spaces 74 between the side beams 66 and the headers 48. As can also be seen in FIG. 8, notches 76 are formed in the bottom edges of the two side beams, to provide clearance for the floor frames of the cargo deck when the platform is lowered into the bottom recess 32, in the position shown in FIG. 9.

Figure 9:
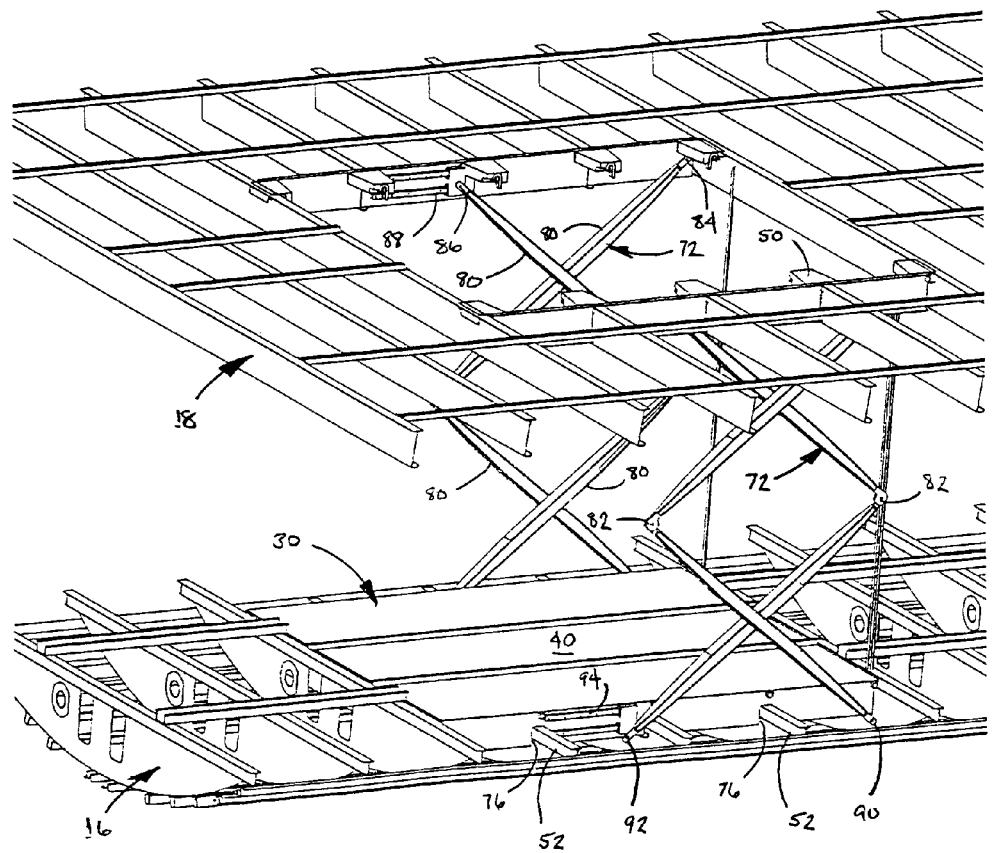
FIG. 9 is a perspective view of the cargo lift assembly and decks of the aircraft of FIGS. 1-5, showing the configuration of the lift apparatus when in a lowered position for receiving/discharging ULDs on the cargo deck of the aircraft.

As can be seen in FIG. 9, each of the scissors-action stabilizing mechanisms includes four rigid arm members 80 arranged in upper and lower X-shaped pairs, that are joined at their ends by pivot connections 82. The upper end of one member in each upper pair is mounted to one of the headers 48 by a stationary pivot connection 84 (one only being visible in FIG. 9), while the upper end of the other member is attached by a second pivot connection 86 to a linear guide 88 that accommodates changes in distance that develop between the two, pivot connections 84, 86 as the lift platform is raised/lowered. Similarly, the lower ends of the two bottom pair members are attached by a stationary pivot connection 90 and a moving pivot connection 92 on each side of the platform, each moving pivot connection being mounted to a linear guide 94.

The scissors-action mechanisms on the two sides of the lift platform stabilize the lift platform against side-to-side and fore-to-aft motions as it is being raised/lowered, as well as against tipping/tilting forces caused by the load. The rigid members are formed of any suitable rigid, high strength material, such as steel or aluminum, and are suitably tapered as shown, in the interest of minimizing weight.

Figure 10:
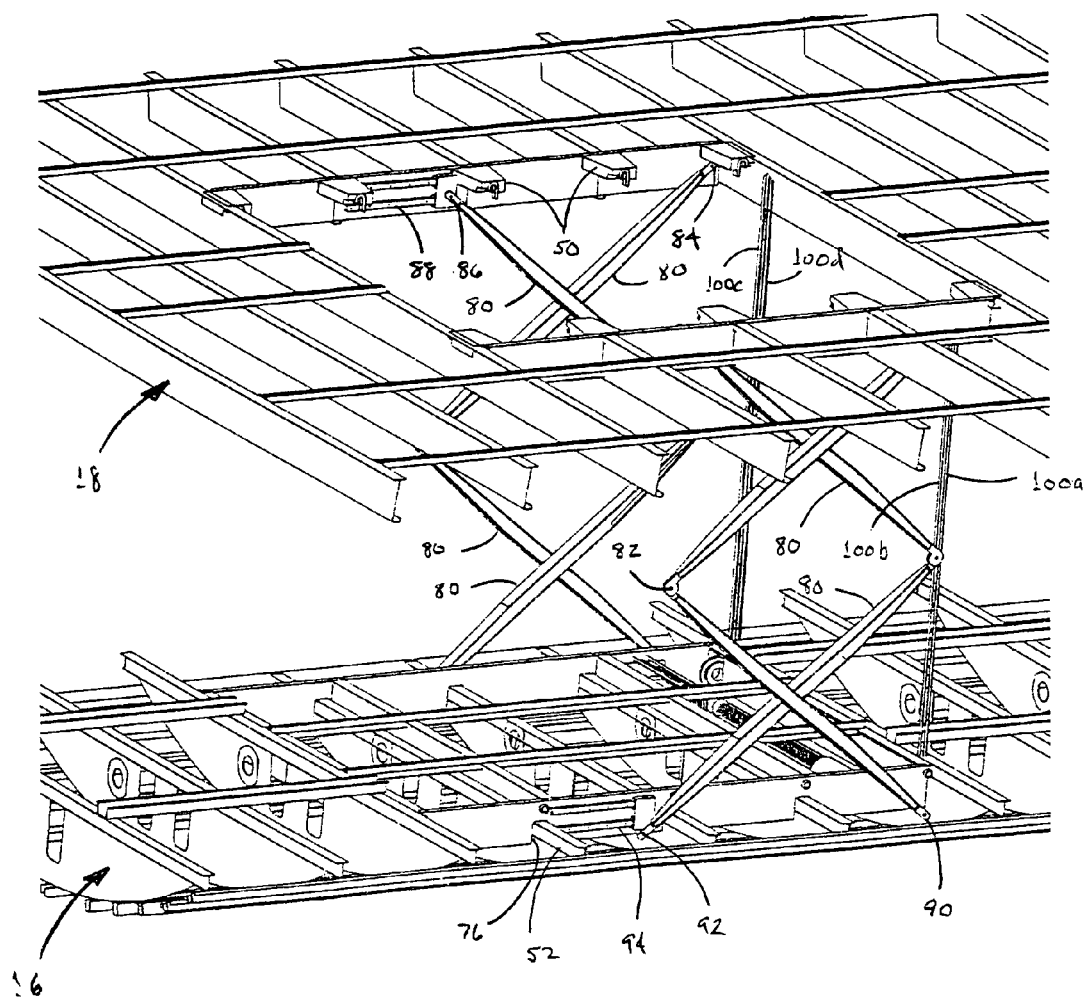
FIG. 10 is a perspective view of the cargo lift assembly in the lowered position, similar to FIG. 7, with the upper floor/cargo of the lift being removed so as to show the positions of the internal mechanism thereof in greater detail.
Figure 11:
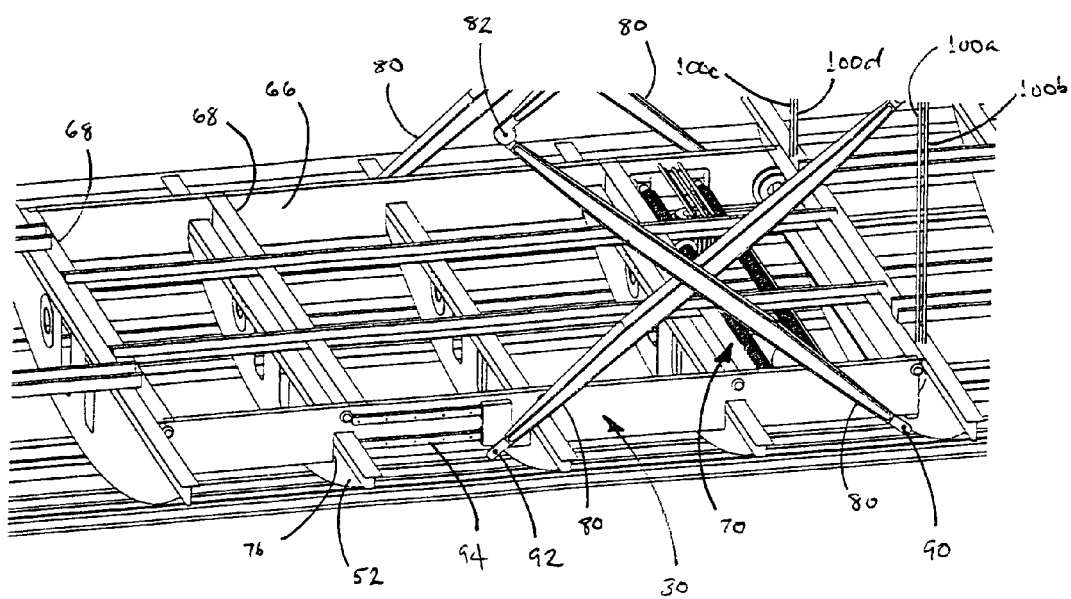
FIG. 11 is an enlarged, perspective view of the lowered cargo lift assembly, similar to FIG. 10, but viewed at a higher angle, showing the position of the mechanism and components in greater detail.

The actual raising/lowering of the lift platform is accomplished by means of cables that are attached to the pulley mechanism 70. As can be seen in FIGS. 9-11, one end of each of the cables 100a-d is attached to the stationary transverse beam at an end of the lift opening 38, while the other ends are lead to the pulley mechanism that is housed within the lift platform itself. The cables are preferably formed of synthetic fiber rope, although any suitable non-metallic or metallic material, or combinations thereof, may be used.

As can be seen in FIGS. 12 and 17-19, the actuating mechanism 70 includes twin ball screws 102a, 102b that span the distance between the two side beams of the frame, the ball screws being driven by an electric motor 104 and reduction gear 106. A paired ball nut 108 is in threaded engagement with both ball screws, and supports pulley set 110 on a common shaft that extends transversely between the individual ball nuts 112a, 112b. Rotation of the screws by the motor and reduction gear selectively moves the paired ball nut in one direction or the other (i.e., it moves towards one end or the other, depending on the direction of rotation of the motor). The ends of the cables are mounted to a plate 124 on the frame member 66 at one end of the actuating mechanism, and are routed over the pulleys carried on the ball nuts so that the cables are paid out or retracted as the ball nuts move one way or the other. Additional pulleys redirect the cables in a vertically, with the other ends of the cables being mounted to the stationary deck beam as noted above. The end plate 114 also carries the bearings 116a, 116b that support the distal ends of the ball screws.

FIGS. 17-19 show the configuration of the pulleys and cables in greater detail: In FIGS. 17-18, the assembly is shown in the retracted position, with the ball nut assembly located towards the left adjacent to the drive motor, while FIG. 19 shows the ball nut assembly moved towards the right so that the cables are paid out from the assembly in an extended position.

As can be seen, the pulley set 110 that is carried on the pair of ball nuts includes first and second paired, stepped pulley units 120a, 120b. The cables are led in pairs—100a, 100b and 100c, 100d—from the base plate 114, longitudinally (i.e., parallel to the ball screws) over the two stepped pulley units 120a, 120b, and then in reverse direction back towards the base plate. The cable pairs are redirected in a horizontal direction outwardly from the actuating mechanism by a set of vertical-axis stepped pulleys 122a, 122b, and are then redirected into vertical legs by horizontal-axis stepped pulley units 124a, 124b; a second vertical-axis stepped pulley unit 126 is used to lead cables 100a, 100b to the opposite end of the assembly, but is not required for the other cable pair 100c, 100d. The stepped pulley sets serve to ensure equal travel above the cables, i.e., the cables are routed over the larger- and smaller-diameter pulleys in each set so that the travel is the same despite the offset distance between the cables in each pair 100a, 100b and 100c, 100d.

Accordingly, actuating the motor in a first direction so as to cause the ball nut assembly to move towards the motor (i.e., to the left, as shown in FIG. 17) increases the distance between the paired pulley set 110 and the base plate 114. This in turn increases the length between the paired pulleys and the base plate, and the lower cable leg between the pulleys 110 in the vertical axis pulley sets 122a, 122b, so that the cables are retracted into the lift platform the latter is drawn to its raised position, as shown in FIGS. 6-8. Operating the motor in the reverse direction causes the ball nut assembly 108 to move in the opposite direction (towards the right as viewed in the figure) shortening the distance between the pulley set 110 and the base plate 114. This causes the cables to be paid out from the actuating mechanism, lowering the lift deck to the position that is shown in FIGS. 9-11.

The preferred actuating system that is shown in the figures results in a 2:1 ratio of platform movement to pulley movement, which is a significant factor allowing the actuation system to be nested laterally within the platform.

Use of twin ball screws prevents eccentric loading on the ball nuts should a cable fail; the load on a single ball screw may increase but there would not be any induced bending. The use of multiple cables also provides a degree of redundancy and added safety; the cables are preferably sized so that any single cable is capable of supporting the platform against falling in the event that the other cables are damaged or fail. Moreover, use of cables on two sides of the platform rather than at a single attachment point reduces torsion and bending loads during operation of the system.

The power requirements of the electrical motor 104 are easily met by either ground or onboard (aircraft) sources, supplied to the motor by an electrical cable as described above.

FIGS. 14 and 15 show more clearly the manner in which the scissors-action guide mechanisms extend and collapse as the platform is raised and lowered. As can be seen in FIG. 14, the collapsed scissors mechanism 72 nests entirely within the height of the main passenger deck 18 itself, so that there are no projections above the floor that would interfere with use of the passenger space 130, nor below the lower edges of the lower deck beams that would interfere with use of the full volume of the lower lobe cargo compartment 132.

As can be seen more clearly in FIG. 15, the upper and lower pairs 134a, 134b of members in each of the scissors action stabilizing mechanisms is joined by a central pivot connection 136 in an X-shaped configuration. As was noted above, the adjoining ends of the upper and lower X-shaped pairs are in turn joined by pivot connections 82. All the pivot connections, including those on the upper deck (84, 86) and on the lift platform (90, 92), have axes that are aligned in the horizontal direction, so that the mechanism is able to collapse in the vertical plane while remaining stable in the horizontal plane.

As the lift platform is lowered, the distance shortens between the fixed and moving pivot points 84, 86 and 90, 92, at the upper and lower ends of the scissors action mechanism, as shown in FIG. 15. As the platform is raised in turn, the ends spread apart, increasing the distance between the fixed and moving pivot connections. As was noted above, this relative movement is accommodated by the upper and lower linear guides 98, 94 on which the moving pivot points are mounted.

FIG. 16 shows the structure of the linear guides in greater detail, and also the manner in which the upper and lower pairs of scissors action members nest atop one another in the area between the lift platform and the stationary deck. As can be seen, each of the linear guide assemblies 88, 94 includes a pair of parallel, guide rails 140, those of the upper guide assembly being mounted to the headers 48 at the sides of the opening 38, and those of the lower guide assembly being mounted to the two side beams 66 of the lift deck.

Each of the guide assemblies includes a stationary, parallel pair of T-shaped (in cross section) rails 140 that are received in corresponding parallel channels in sliding bracket members 144, so that the latter are free to slide in a horizontal direction while being supported vertically. The pin 92 that forms the lower sliding pivot is mounted to a downwardly projecting portion of the outboard, lower sliding bracket member, while the pivot pin of the upper pivot joint is mounted to the upper sliding bracket member. As can be seen in FIG. 16, the axes of the upper and lower pivot pins 86, 92 are parallel to one another and are offset vertically to allow the members 80 of the upper and lower scissors action assemblies 134a, 134b to stack atop one another as noted above. In addition, the upper pivot pin 86 is elongated, so as to space the rigid member 80 that is connected thereto away from the sliding bracket by a distance sufficient to accommodate the neighboring rigid member of the upper pair.

The guide rails 142 and/or the channel portions in which they are received may be formed of metal, provided with suitable lubrication. In some embodiments, however, either or both may be formed of a polymeric material having low friction and self-lubricating characteristics combined with strength and durability, such as Delrin™, for example.

Linear guide assemblies that have been described above have the advantages of compactness, durability and ease of maintenance. It will be understood, however, that other types of linear guide mechanisms known to those skilled in the relevant art may be employed in other embodiments of the invention.

As noted above, installation of the cargo lift system of the present invention does not significantly affect the structural integrity and load capacity of the aircraft, and of the main, passenger deck in particular, due to the lift platform becoming an integral part of the aircraft structure when in the up/stowed position. This is a very significant advantage since, in addition to the general loading due to passengers or cargo, the floor beams of the passenger deck carry significant lateral load in a pressurized aircraft. Consequently, it is important to maintain lateral continuity in the deck in order to ensure minimal changes to the fuselage loads during flight.

As can be seen in FIG. 13, the locking mechanisms 50 are mounted on the two longitudinal sides of the lift opening 38, at the ends of the truncated floor beams 46. Consequently, when latched to the raised lift platform, the latch mechanisms connect the ends of the beams to the transverse beams of the platform so as to essentially establish continuity for each beam across the entire deck.

As can be seen in FIG. 20, each of the latch mechanisms 50 includes a locking cam 150 having a receiver 152 mounted at the distal end of a rotatable shaft 154. The opposite end 156 is mounted to an actuating linkage (not shown), such as a shaft-operated bell-crank linkage that rotates all of the cam locks simultaneously. A cover flange 58 projects from the header 48 over the top of the latch mechanism, to protect the mechanism and also to support the floor panel 159 (see FIG. 13) about the perimeter of the opening 38.

The receivers 152 engage locking pins or lugs 160 that are mounted to the side beams 66 of the lift platform 30. As can be seen in FIG. 21, each of the locking pins in the preferred embodiment includes a short, generally cylindrical head portion 162 having bevelled edges 164 and a flat, circular top 166, and a reduced-diameter base portion 168. The locking pins 160 are mounted to the edges of the lift deck 30 by welding or other suitable means.

As can be seen in FIG. 22, the receiver portions of the cam latches each include a generally semi-circular receptacle area 170 that is sized and shaped to receive the cooperating pin member 160 in locking engagement therewith, and a tangentially-extending ramp portion 172 for engaging the edges of the pin member and guiding it into the receptacle area. A channel having a flat base 174 extends along the inside surface of the ramp portion and into the receptacle area 170, for engaging the cylindrical wall 162 of the pin member, the channel being bordered by bevelled edges 176a, 176b that cooperate with the bevelled edges 164 on the pin member.

FIGS. 23-25 illustrate the sequential steps in engagement and locking of the latch and pin members 150, 160. As can be seen in FIG. 23, the latch and pin members are arranged in vertical alignment, with the latch member initially being rotated to a position in which the ramp portion 172 extends in a downward direction. Thus, as the lift deck is raised, the ramp portion 172 cooperates with the surfaces of the locking pin to direct the latter into the opening 178 of the semi-circular receiving area 170.

Once the pin member 160 has entered the receptacle area of the latching member, as shown in FIG. 24, the latter is rotated in the direction indicated by arrow 182 so as to draw in and capture the pin member within the receiver 152. In the final, latched position that is shown in FIG. 25, the pin member is supported vertically by the lower wall portion 184 of the latching member, and is restrained in the horizontal direction by the engagement of the bevelled edges 164, and 176a, 176b. The latch mechanism consequently transfers loads in all directions between the transverse beams of the deck and lift platform, so that the latter is, in a structural sense, integrated into the passenger deck 18 of the aircraft in the manner described above.

Accordingly, when the latches are in the locked position, loads are transferred directly from the truncated deck beams to the transverse beams of the platform, by the shaft portions of the latch mechanisms, so that lateral and vertical load carrying capabilities are preserved intact as compared with the unmodified floor structure. The spherical pin design provides lateral and vertical restraint while permitting limited rotation, thus reducing component size and strength requirements. It will be understood that the orientation of the components may be reversed from those that are shown, i.e., the pins in the cam latches can be mounted on either the platform or the passenger deck, depending on design factors.

The latch mechanism described with reference with FIGS. 20-25 thus provides significant advantages in terms of durability and reliable operation, however, it will be understood that other forms of latch mechanism may be used in some embodiments.

FIGS. 26A-29 illustrate a cargo lift apparatus in accordance with a second embodiment of the present invention, which is particularly suited to use with double-decker "jumbo" aircraft, but is not limited thereto.

Accordingly, FIG. 26A shows a conventional "jumbo" aircraft 200 having a double-decker configuration, in this case, a Boeing model 747. When configured as a dedicated cargo carrier, palletized cargo is carried in ULDs 202 on the main deck 204 of the aircraft, i.e., the deck that would provide seating in a passenger configuration. Cargo is also carried in the lower lobe in a conventional manner. However, the upper deck of the aircraft, in the area indicated at 206, is unutilized.

FIG. 26B, in turn, shows a modified aircraft 208 having a lift apparatus 210 in accordance with the present invention installed therein, which permits additional ULDs 212 to be raised from the main deck 204 to the upper deck 214. Not only does this make it possible to carry cargo in the previously unutilized space 206, it also renders it feasible to modify the aircraft to carry additional cargo on the upper deck by extending the upper fuselage compartment as shown at 216.

The lift apparatus 210 is broadly similar to that of the embodiment described above, in that it likewise utilizes a lift platform 220 that houses a substantially self-contained operating mechanism, and that mounts structurally to the upper deck when in the raised, stowed position. However, the lift and stabilization mechanisms are configured to accommodate the larger loads anticipated in a wide-body "jumbo" aircraft, as well as the greater height between decks and other differences in geometry. The lift platform 220 therefore lowers and raises between the upper and main decks 214, 204 of the aircraft, transferring ULDs 212 to/from the upper deck via the through opening 228. As was also described above, a divider panel 230 may be provided on the upper deck to section off the cargo area from other areas of the space.

As can be seen in FIG. 27, the lift platform 220 employs four cable pairs 222a-d, that are paid out and retracted at the longitudinal sides of the platform, near the front and rear corners thereof. In addition, the platform is stabilized by guide legs 224a, 224b that pivot downwardly and lock in a vertical position as will be described below, rather than the scissors-action stabilizer mechanism previously described.

FIG. 28 shows the lift platform 220 and its operating mechanism in greater detail. Similar to the embodiment described above, the drive mechanism 232 employs horizontally-extending ball screws and nuts that are encompassed within the vertical height of the deck. In this embodiment, however, two paired ball screw and nut assemblies 234a, 234b are provided for the two sides of the assembly, the ball screws being driven by a single, central motor 236 via a common gear box 238. Operation of the motor drives the two nut assemblies and their associated pulleys in opposite directions, i.e., so that they diverge outwardly towards the two side rails 240a, 240b of the platform and converge inwardly towards the motor 238, depending on the direction of rotation of the motor. As the ball nut assemblies move towards the sides of the platform, the distance shortens between the pulley sets and the cable attachment points, so that the cable pairs are paid out from the platform, and vice versa. The cable pairs 222a, 222b that are located proximate the distal ends of the ball screws are redirected in a vertical direction by horizontal axle pulley sets 242a-242b, while the other cable pairs 220c-220d are first directed towards the other corner by vertical axle pulley sets 244a-244b, and are then redirected outwardly and then upwardly by vertical and horizontal axle pulley sets 246a-246b and 248a-248b (the axes of the pulley sets may be angled slightly from vertical/horizontal as to direct the cable pairs on to the shives of the pulleys in an efficient manner).

Thus, operating the motor 236 so as to pay out the cable pairs lowers the lift platform from the upper deck to the main deck as described above, while operating it in the reverse direction raises the platform back to the upper deck. The platform has an inherent degree of stability due to the location of the four cable pairs 222a-222d at its corners. Moreover, because each cable (which is suitably a synthetic fiber rope, as described above) is paired with a mate, a degree of redundancy is ensured in the event that any single cable should fail.

FIG. 29, in turn, illustrates the operation of the vertical guide legs 224a-224b. As can be seen, the two legs next parallel to one another along one of the transverse edges of the lift platform when the latter is in its raised and stowed position.

Prior to actuation of the lift platform, however, the guide legs pivot downwardly, as indicated by arrows 254, passing progressively through positions 224a'-b' and 224a"-b", until reaching vertical alignment at position 224a'''-b'''. At vertical alignment, pin portions 256 on the distal ends of the legs enter sockets in receivers 256a-b on the main deck, so as to temporarily lock the guide legs in a vertical position.

Figure 30:
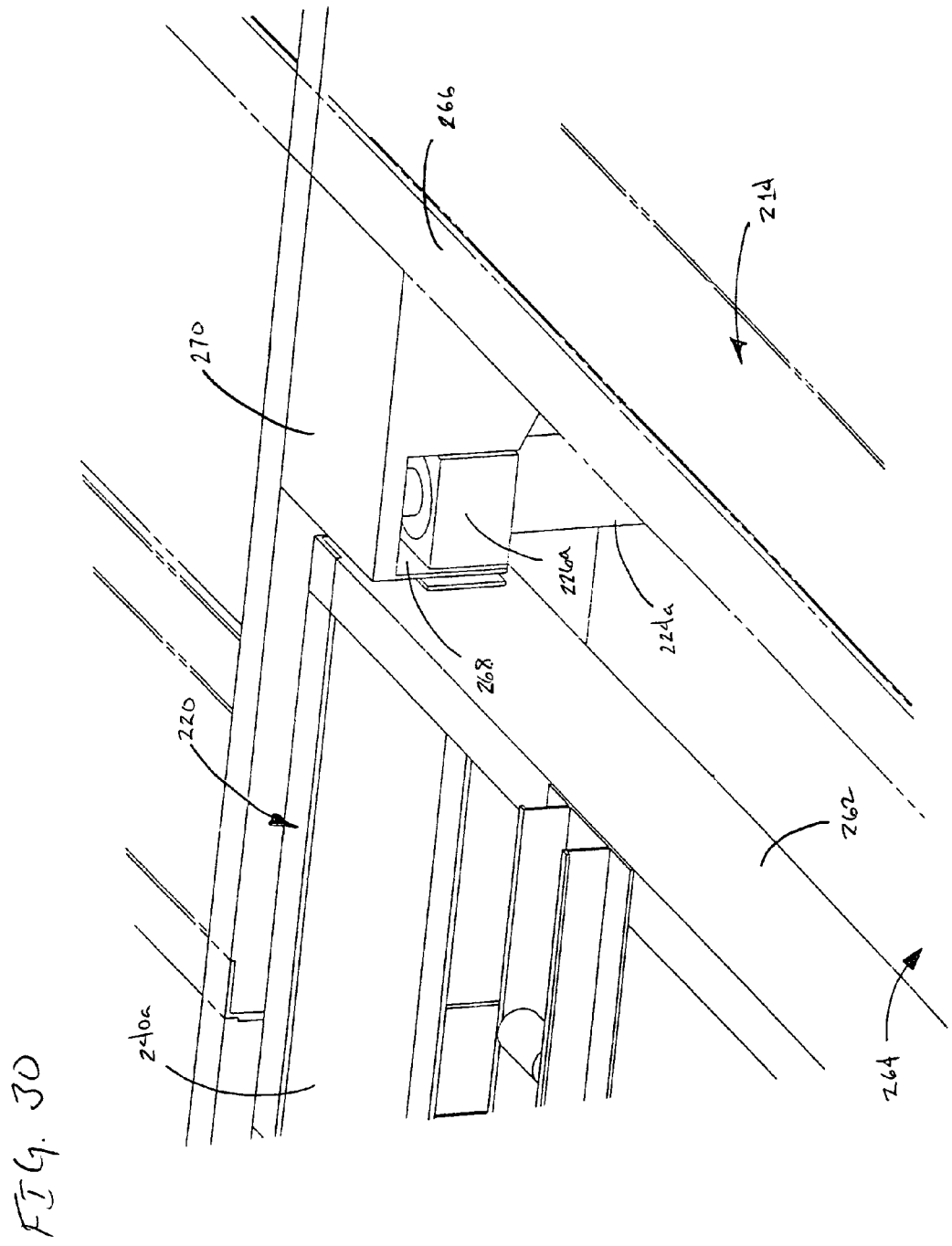
FIG. 30 is an partial, perspective view of the lift platform and one of the stabilizer legs of FIG. 29, showing the manner in which the upper end of the stabilizer leg and the associated sliding guide member are accommodated within a receiver structure that is mounted to the upper deck of the aircraft.
Figure 31:
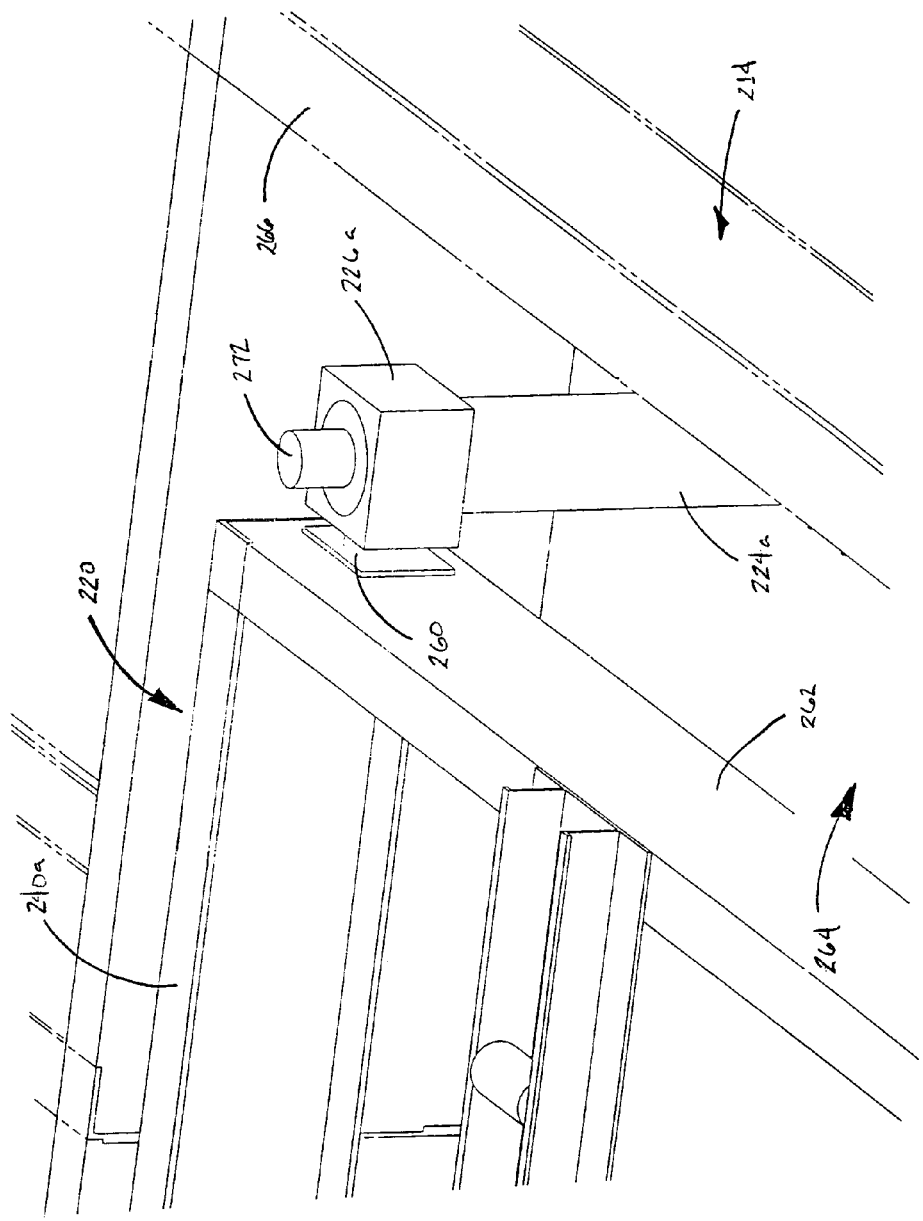
FIG. 31 is a partial, perspective view of the lift platform and upper end of the stabilizer leg, similar to FIG. 30, with the receiver being removed to show the pivotable mounting of the lift platform to the stabilizer guide block in greater detail.

As can be seen more clearly in FIG. 30, each of the guide legs 224a-b is received in one of the guide blocks 226a-b in sliding engagement therewith. The guide block, in turn, are joined to the lift platform 220 by short stub axles 260, that project from one of the transverse edge beams 262 of the platform. Short, blind bores in the guide blocks receive the stub axles in rotatable engagement, enabling the legs to pivot from the horizontal, stowed position to the vertical, deployed position, and vice versa, in the manner described above. When in the stowed position, the nested legs are accommodated within the spaced, gap 264 between the transverse frame member of the platform and the transverse beam 266 at the edge of the deck opening.

When the lift platform 220 is in its raised position, the guide blocks 226a-b are accommodated within downward facing openings 268 of receivers 270 mounted to the upper deck (see FIG. 30). The receiver openings accommodate rotation of the guide blocks as the stabilizer legs are pivoted between their stowed and deployed positions. The receivers also include socket openings (not shown) that engage reduced diameter pin portions 272 at the upper ends of the legs, and that may be driven by a motor or other suitable means through a 90 degree arc (e.g., via a gear or crank linkage) to pivot the legs between the stowed and deployed positions.

In operation, the guide legs 224a-b are first deployed to their vertical orientation, with the pins on the lower ends of the legs being locked in the lower receivers 256a-b. The drive mechanism 232 of the lift platform is then actuated to lower and raise the platform, with the guide blocks 226a-b sliding along the vertical legs to stabilize the platform against any motion in a side-to-side or front-to-rear direction.

As was noted above, a cutout in the underlying floor receives the lift platform when the latter is in its lowered position; when the platform has been raised and stowed, a pair of rails may be set across the cutout to span the opening. However, removing and replacing the rails involves a degree of delay, and moreover, this approach may not be satisfactory under circumstances where a more continuous floor surface is required.

FIGS. 32-36 consequently show a translating floor assembly in accordance with the present invention, that forms a generally continuous floor surface when raised, but that can be lowered to clear the receiving area for the lift platform when needed.

Figure 32:
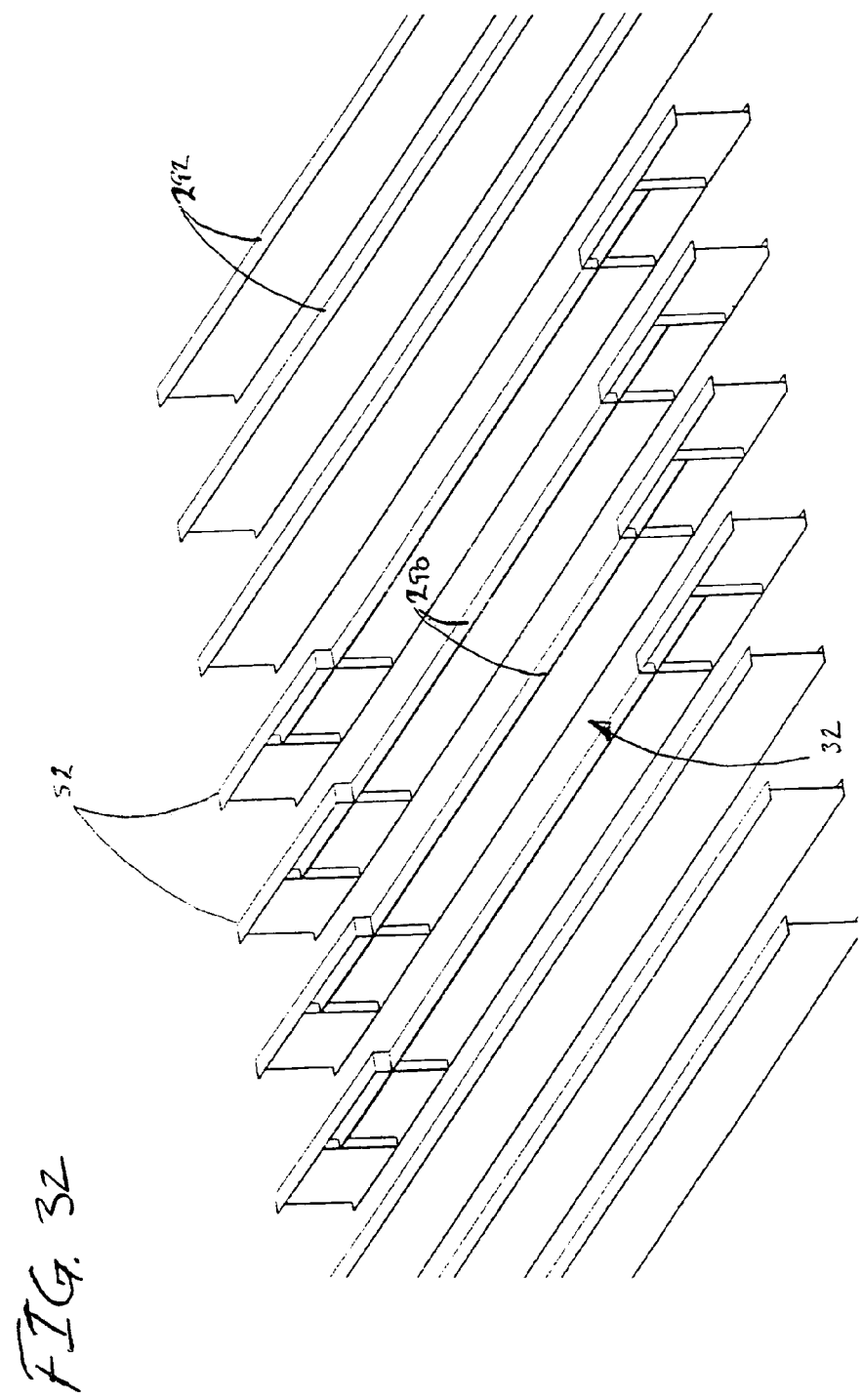
FIG. 32 is a perspective view of a portion of the cargo deck floor of the aircraft, showing an area in which the upper edges of the transverse floor frames are removed to form a recess that accommodates the lift platform when the latter is in the lowered position.

The first figure, FIG. 32, shows the floor recess 32 that receives the lift deck when it is in the lowered position, this area being formed (as noted above) by the cutaway, lowered upper edges 290 of lateral floor frames 52, that lie at a level below the floor surface that is defined by the upper edges 292 of the intact frames.

Figure 33:
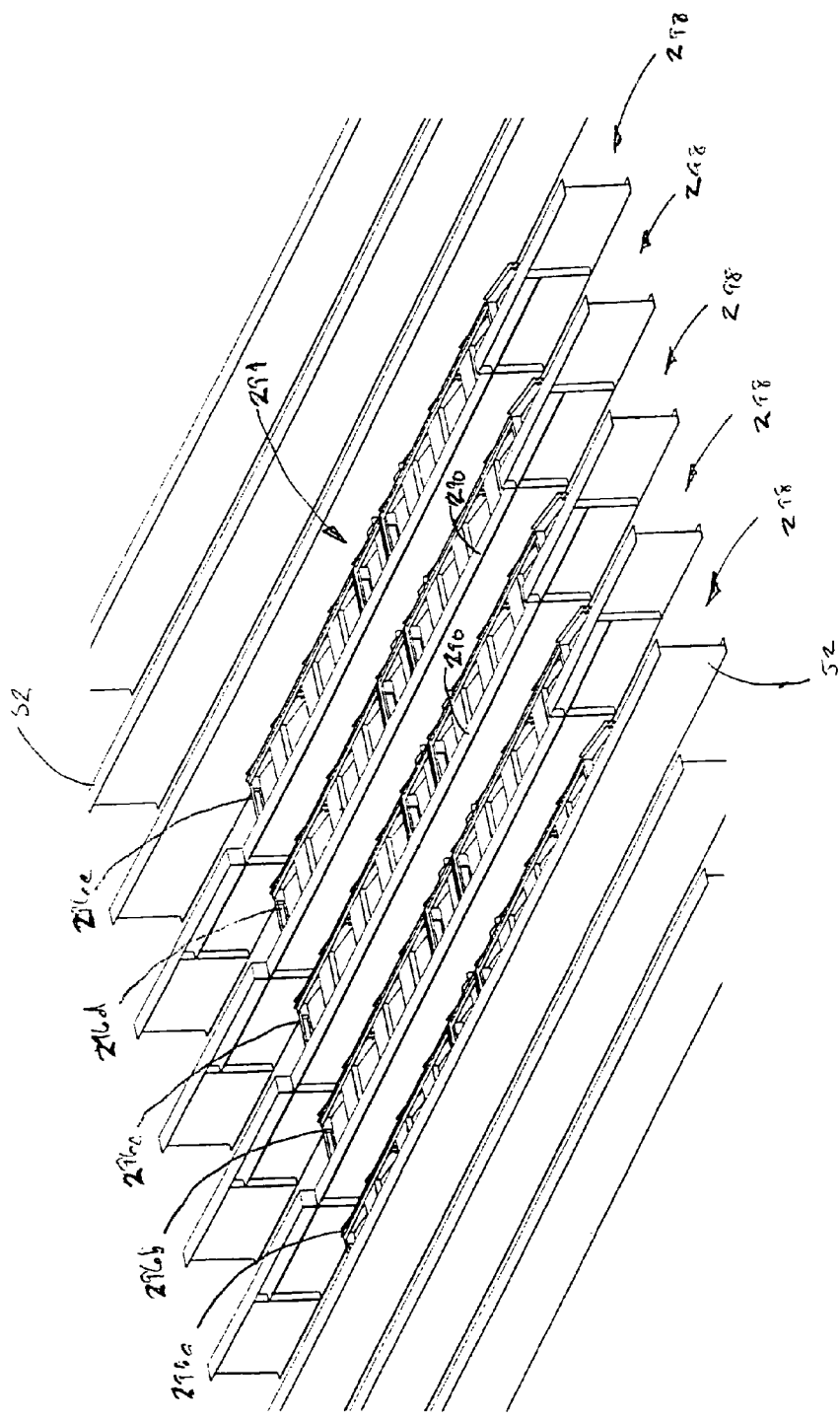
FIG. 33 is a second perspective view of the area of the cargo deck floor of FIG. 32, showing a translating, drop down floor assembly in accordance with the present invention installed in the spaces between the lateral frames, the assembly being shown in its lowered position in which the recess formed at the tops of the frames is cleared to receive the lift platform.

As can be seen in FIG. 33, the drop-away, translating floor assembly 294 is made up of a series of folding floor sections 296a-e that are mounted in the intercostal spaces 298 between the laterally extending floor frames 52, so that each of the cut-down frames is flanked by a pair of the folding sections. The assembly is shown in its lowered configuration in FIG. 33, with the sections 296a-e folded generally flat at the bottoms of the intercostal spaces. The lowered sections therefore lie below the level of the cutaway edges 290, so that the recess is cleared to allow the lift platform to be lowered therein in the manner described above.

Figure 34:
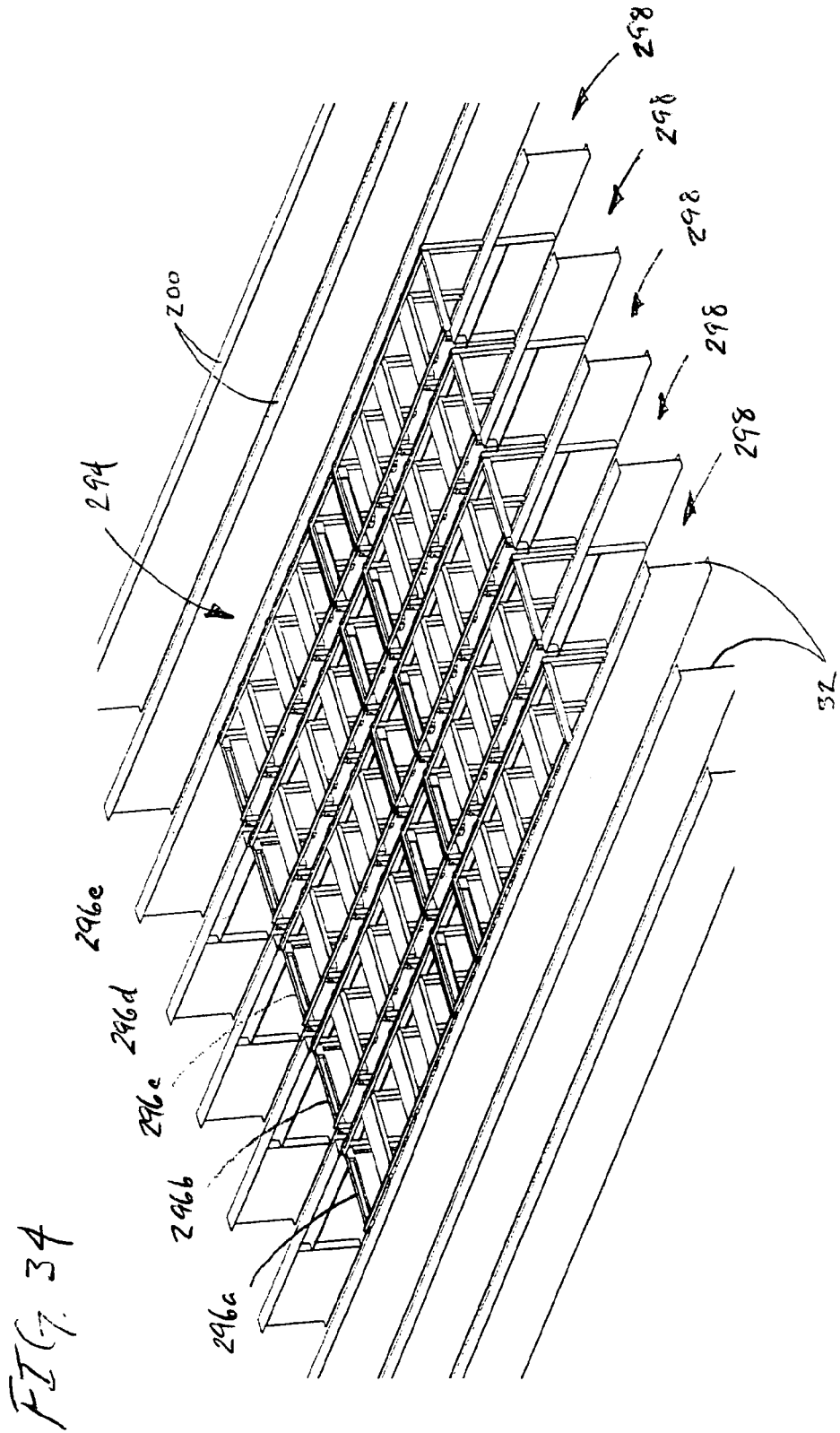
FIG. 34 is a second perspective view of the cargo deck floor and translating floor assembly of FIG. 33, showing the assembly in a raised position in which it forms a continuation of the cargo deck floor over the area of the recess after the lift platform has been raised and stowed.

FIG. 34, in turn, shows the floor assembly 294 in its raised position, with the series of floor sections 296a-e being unfolded and raised within their intercostal spaces so that in combination they define a floor surface that is generally continuous and level with the main floor surface that is defined by the upper edges 300 of the intact floor frames. As can be seen in FIG. 34, each of the folding floor sections includes a series of short, longitudinally extending plate-like deck segments 302 supported at the ends by paired legs 304. The upper ends of the legs are joined by elongate rod members 306 that are pivotably mounted to the legs and that extend laterally within the intercostal space. The lower ends of the legs, in turn, are pivotably mounted to brackets (not shown) or other fittings towards the bottom of the intercostal space. The panels and legs thus form individual segments 308 that, being linked by the lateral rods 306, move in concert as the floor section is raised/lowered. The deck segments 302 are mounted fixedly to the lateral rod members 306, in co-planar relationship therewith, so that when the head of the section is in its raised position (as shown in FIG. 35A), the deck segments all lie horizontal in side-by-side relationship, level with the main, floor surface. When the section is lowered, as shown in 35B, the deck segments (and the rod members 306) remain horizontal, but the support legs 304 pivot downwardly to lower them towards the bottom of the intercostal space. In the embodiment that is illustrated in FIGS. 35A-B, the deck segments 302 are comparatively narrow and are separated from one another by a series of gaps; in other instances, such as for use in the deck of a passenger area, the edges of the deck segments may meet, or the individual segments may be replaced with one or more laterally extending panels, so as to form a continuous, uninterrupted floor surface when in the raised position.

Raising and lowering of the section is accomplished, in the illustrated embodiment, by means of a pair of actuator segments 310a, 310b. As can be seen in FIG. 30, the actuator segments each include a pair of support legs 312 having an open-sided channel configuration, which configuration can be used for the legs 304 of the other, unpowered segments as well. An elongate actuation link 314 is received in the open side of each of the legs of the powered segments, with its upper end being joined to the upper end of the leg by a horizontal axis pivot pin 316 that also serves to pivotably mount the upper end of the leg to one of the rod members 306 of the upper frame; in the embodiment that is illustrated, the rod members are spanned at the upper ends of legs 312 by longitudinal seat track segments, rather than planar deck segments, allowing seats to be installed thereon when the assembly is in its raised position. The lower end of each pivot link is joined to an actuation arm 316 by a second pivot pin 318, with the actuation arm in turn being fixedly mounted to an end 320 of a torque tube 322. The pivot pin 318 for the lower end of the actuation link is spaced from the end of the torque tube, so as to create a crank-arm when the torque tube is rotated. As can be seen, the actuation arm suitably has a channel configuration, with the end of the actuation link being received in the interior of the channel and the pivot pin 318 spanning between the sides thereof.

Rotation of the torque tubes (in a clockwise direction as seen in FIG. 36) causes the actuation links to draw on the upper ends of the support legs 312, pivoting the legs about their lower attachment points 324 and thus raising the upper frame and deck segments to their elevated position as described above. As the legs reach their vertical orientation, the lower ends of the actuation links rotate to an over center position (i.e., to a position on the opposite side of the torque tube from the support leg), locking the assembly in its raised position. The assembly is lowered by rotating the torque tubes in an opposite direction, which raises the ends of the actuation links from their over center positions, releasing the assembly from its locked configuration, and pivots the legs downwardly towards a horizontal orientation.

The torque tubes may be rotated by one or more motors (not shown) or other suitable drive devices. Rotation of the torque tubes is preferably linked so that all of the sections in the floor assembly 294 rise/fall simultaneously with minimal delay.

The translating floor assembly thus allows the lift assembly of the present invention to be used with no reduction in allowable floor space in the aircraft. The embodiment that has been described with reference to FIGS. 32-36 provides several significant advantages, particularly in terms of providing a compact, modulized system that is economical to produce and is relatively light in weight. It will be understood, however, that other types of temporary/moveable floor structures and mechanisms may be employed in conjunction with the lift platform of the present invention, as has been described above.

It is therefore to be recognized that these and various other alterations, modifications, and/or additions may be introduced into the constructions and arrangements of parts described above without departing from the spirit or ambit of the present invention as defined by the appended claims.

What is claimed is:

1. An apparatus for transferring cargo between an upper deck and a lower deck of an aircraft, said apparatus comprising:
   a lift platform that is receivable in a through opening formed in said upper deck of said aircraft, said lift platform having an upper surface for supporting a load of cargo thereon;
   means for lowering and raising said lift platform between said upper deck and said lower deck so as to transfers loads of cargo to and from said upper deck via said through opening, said means for lowering and raising said lift platform comprising:
   a lift mechanism comprising:
      at least one lift cable; and
      a drive assembly that selectively extends and retracts said lift cable so as to lower and raise said lift platform;
      substantially the entirety of said drive assembly being housed within said lift platform; and
   means for selectively attaching edges of said lift platform to said upper deck in load-bearing engagement therewith when said lift platform is raised and stowed in said through opening, so that said lift platform shares structural loading of said upper deck during flight operation of said aircraft.

2. The apparatus of claim 1, further comprising:
   means for stabilizing said lift platform as said lift platform is lowered and raised between said upper and lower decks of said aircraft.

3. The apparatus of claim 2, wherein said means for stabilizing said lift platform comprises:
   first and second stabilizer legs for extending substantially vertically between said upper and lower decks; and
   first and second guide members that are mounted to said lift platform and that are in longitudinal sliding engagement with said stabilizer legs.

4. The apparatus of claim 3, wherein said first and second stabilizer legs comprise:
   first and second elongate leg members that are selectively pivotable from a first, horizontal position in which said leg members nest alongside said lift platform when said lift platform is in said raised and stowed position; and a second, vertical position in which said leg members stabilize said lift platform as said lift platform is lowered and raised between said upper and lower decks.

5. An apparatus for transferring cargo between an upper deck and a lower deck of an aircraft, said apparatus comprising:
   a through opening in said upper deck of said aircraft, said through opening comprising:
      first and second longitudinally extending side edges formed across ends of a plurality of truncated lateral beams of said upper deck; and
      first and second longitudinal headers mounted across said ends of said truncated lateral beams and to intact lateral beams forward and aft of said through opening;
   a lift platform that is receivable in said through opening in said upper deck, said lift platform comprising:
      an upper surface for supporting a load of cargo thereon; and
      first and second longitudinally extending side edges that are positioned generally adjacent to said side edges of said through opening when said lift platform is in said raised position;
   a drive assembly for selectively raising and lowering said lift platform between said upper deck and said lower deck so as to transfer loads of cargo to and from said upper deck via said through opening, said drive assembly comprising:
      a motor and drive mechanism that are substantially entirely housed within said lift platform;
   means for stabilizing said lift platform as said lift platform is lowered and raised between said upper deck and said lower deck of said aircraft; and
   a locking assembly for attaching said longitudinally extending side edges of said lift platform to said side edges of said through opening in load-bearing engagement therewith when said lift platform is stowed in said through opening, so that said lift platform shares structural loading of said upper deck in a lateral direction during flight operation of said aircraft, said locking assembly comprising:
      at least one locking unit for attaching each longitudinal edge of said lift platform to a longitudinal edge of said through opening, each locking unit having a first lock portion mounted on said edge of said lift platform, and a second lock portion mounted on said header at said edge of said through opening for establishing load-bearing engagement with said first lock portion on said lift platform.

6. An apparatus for transferring cargo between an upper deck and a lower deck of an aircraft, said apparatus comprising:
a lift platform that is receivable in a through opening formed in said upper deck of said aircraft, said lift platform having an upper surface for supporting a load of cargo thereon and said through opening having side edges spanning a plurality of truncated lateral beans of said upper deck, said lift platform comprising:
a plurality of lateral beams that span a width of said lift platform and that are aligned axially with said truncated beams of said upper deck when said lift platform is raised and stowed in said through opening;
means for lowering and raising said lift platform between said upper deck and said lower deck so as to transfer loads of cargo to and from said upper deck via said through opening; and
means for selectively attaching edges of said lift platform to said upper deck in load-bearing engagement therewith when said lift platform is raised and stowed in said through opening, so that said lift platform shares structural loading of said upper deck during flight operation of said aircraft, said means for selectively attaching edges of said lift platform to said upper deck in load-bearing engagement therewith comprising:
means for selectively attaching first and second longitudinally extending side edges of said lift platform to first and second longitudinally extending side edges of said through opening, so that said lift platform shares structural loading of said upper deck in a lateral direction during flight operation of said aircraft, said means for selectively attaching said side edges of said lift platform to said side edges of said through opening comprising:
a plurality of lock assemblies, each said lock assembly being located at an axial juncture between one of said truncated beams of said upper deck and one of said lateral beams of said lift platform when said lift platform is raised and stowed in said through opening, each said lock assembly comprising:
a first lock portion that is mounted to a longitudinal side edge of said lift platform; and
a second lock portion that is mounted to a longitudinal side edge of said through opening for establishing load-bearing engagement with said first lock portion on said lift platform.

7. The apparatus of claim 6, further comprising:
longitudinally extending header members mounted across said ends of said truncated beams of said upper deck, and to intact lateral beams of said upper deck at forward and after ends of said through opening.

8. An apparatus for transferring cargo between an upper deck and a lower deck of an aircraft, said apparatus comprising:
a lift platform that is receivable in a through opening formed in said upper deck of said aircraft, said lift platform having an upper surface for supporting a load of cargo thereon;
means for lowering and raising said lift platform between said upper deck and said lower deck so as to transfer loads of cargo to and from said upper deck via said through opening, said means for lowering and raising said lift platform comprises:
a lift mechanism comprising:
at least one lift cable; and
a drive assembly for selectively extending and retracting said lift cable so as to lower and raise said lift platform, said drive assembly comprising:
an anchor point for an end of said at least one lift cable;
at least one ball screw and nut in cooperating drive engagement, said ball nut being located a spaced distance from said anchor point;
at least one pulley mounted to said ball nut, said lift cable being routed over said pulley from said anchor point; and
a motor for reversibly rotating said ball screw, in a first direction that shortens said distance between said pulley and said anchor point so as to extend said cable from said lift platform, and in a second direction that increases said distances between said pulley and said anchor point so as to retract said cable into said lift platform;
substantially the entirety of said drive assembly being housed within said lift platform ; and
means for selectively attaching edges of said lift platform to said upper deck in load-bearing engagement therewith when said lift platform is raised and stowed in said through opening, so that said lift platform shares structural loading of said upper deck during flight operation of said aircraft.

9. The apparatus of claim 8, wherein said at least one ball screw and nut are mounted to extend generally horizontally within an interior height of said lift platform.

10. An apparatus for transferring cargo between an upper deck and a lower deck of an aircraft, said apparatus comprising:
a lift platform that is receivable in a through opening formed in said upper deck of said aircraft, said lift platform having an upper surface for supporting a load of cargo thereon;
means for lowering and raising said lift platform between said upper deck and said lower deck so as to transfer loads of cargo to and from said upper deck via said through opening, said means for lowering and raising said lift platform comprising:
a lift mechanism comprising:
at least one lift cable; and
a drive assembly for selectively extending and retracting said lift cable so as to lower and raise said lift platform;
substantially the entirety of said drive assembly being housed within said lift platform;
means for stabilizing said lift platform as said lift platform is lowered and raised between said upper and lower decks of said aircraft, said means for stabilizing said lift platform comprising:
first and second stabilizer legs for extending substantially vertically between said upper and lower decks, said first and second stabilizer legs comprising:
first and second elongate leg members that are selectively pivotable between a first, horizontal position in which said leg members nest alongside said lift platform when said lift platform is in said raised and stowed position, and a second, vertical position in which said leg members stabilize said lift platform as said lift platform is lowered and raised between said upper and lower decks; and
means for selectively attaching edges of said lift platform to said upper deck in load-bearing engagement therewith when said lift platform is raised and stowed in said through opening, so that said lift platform shares structural loading of said upper deck during flight operation of said aircraft.

11. An apparatus for transferring cargo between an upper deck and a lower deck of an aircraft, said apparatus comprising:
- a lift platform that is receivable in a through opening formed in said upper deck of said aircraft, said lift platform having an upper surface for supporting a load of cargo thereon;
- means for lowering and raising said lift platform between said upper deck and said lower deck so as to transfer loads of cargo to and from said upper deck via said through opening;
- means for selectively attaching edges of said lift platform to said upper deck in load-bearing engagement therewith when said lift platform is raised and stowed in said through opening, so that said lift platform shares structural loading of said upper deck during flight operation of said aircraft; and
- a recess in said lower deck of said aircraft for receiving said lift platform therein, so that said upper surface of said lift platform extends substantially flush with an upper surface of said lower deck when said lift platform is lowered therein.

12. The apparatus of claim 11, wherein said recess in said lower deck of said aircraft comprises:
- an area of said lower deck of said aircraft in which upper edges of floor frames have been removed so as to form said recess therein.

13. The apparatus of claim 12, further comprising:
- a translating floor assembly mounted in said area of said lower deck of said aircraft, said translating floor assembly having a first position which defines a floor surface that extends over said recess generally flush with said upper surface of said lower deck, and a second position which clears said recess for receiving said lift platform in said lower deck of said aircraft.

14. The apparatus of claim 13, wherein said translating floor assembly comprises:
- a plurality of folding floor sections, each said folding floor section comprising:
  - a laterally-extending frame that is received in an intercostal space intermediate said floor frames of said lower deck;
  - at least one deck segment mounted to said frame for extending substantially flush with said upper surface of said lower deck when said frame is in a raised position;
  - a plurality of folding leg members, each said leg member having an upper end that is pivotably mounted to said frame and a lower end that is pivotably mounted to said lower deck in said intercostal space intermediate said floor frames; and
  - means for selectively pivoting said leg members between a generally vertical orientation in which said frame is supported substantially flush with said surface of said lower deck, and a generally horizontal orientation in which said frame is dropped into said intercostals space so as to clear said recess to receive said lift platform in said lower deck.

15. The apparatus of claim 14, wherein said means for selectively pivoting said leg members comprises:
- at least one actuation link having an upper end that is mounted to an upper end of one of said folding leg members, and a lower end that is mounted to an actuation arm;
- a torque tube that is mounted to said actuation arm; and
- means for reversibly rotating said torque tube in a first direction such that said actuation link draws said leg member to said vertical orientation, and a second direction such that said actuation link lowers said leg member to said generally horizontal orientation.

* * * * *